(12) United States Patent
Davis et al.

(10) Patent No.: US 7,858,059 B2
(45) Date of Patent: Dec. 28, 2010

(54) MOLECULAR SIEVES FOR IMPROVED HYDROCARBON TRAPS

(75) Inventors: Mark E. Davis, Pasadena, CA (US); Tatsuya Okubo, Machida (JP)

(73) Assignee: California Institute of Technology, Pasadena, CA (US)

( * ) Notice: Subject to any disclaimer, the term of this patent is extended or adjusted under 35 U.S.C. 154(b) by 1097 days.

(21) Appl. No.: 11/040,527

(22) Filed: Jan. 21, 2005

(65) Prior Publication Data
US 2005/0166581 A1 Aug. 4, 2005

Related U.S. Application Data

(60) Provisional application No. 60/541,109, filed on Feb. 2, 2004, provisional application No. 60/555,647, filed on Mar. 22, 2004.

(51) Int. Cl.
*B01D 53/56* (2006.01)
(52) U.S. Cl. .......... 423/213.2; 423/212; 423/213.5
(58) Field of Classification Search .......... 423/212, 423/213.2, 213.5
See application file for complete search history.

(56) References Cited

U.S. PATENT DOCUMENTS

| | | | | |
|---|---|---|---|---|
| 4,056,489 A | * | 11/1977 | Hindin et al. | 502/257 |
| 4,780,436 A | * | 10/1988 | Raatz et al. | 502/66 |
| 4,910,006 A | | 3/1990 | Zones et al. | |
| 4,963,337 A | * | 10/1990 | Zones | 423/277 |
| 5,120,425 A | | 6/1992 | Zones et al. | |
| 5,482,692 A | | 1/1996 | Audeh et al. | |
| 5,512,267 A | | 4/1996 | Davis et al. | |
| 5,536,895 A | * | 7/1996 | Nair et al. | 585/480 |
| 5,646,304 A | * | 7/1997 | Acharya et al. | 549/259 |
| 5,941,068 A | * | 8/1999 | Brown et al. | 60/297 |
| 6,074,973 A | | 6/2000 | Lampert et al. | |
| 6,117,411 A | | 9/2000 | Takewaki et al. | |
| 6,120,581 A | * | 9/2000 | Markovs et al. | 95/99 |
| 6,667,018 B2 | | 12/2003 | Noda et al. | |
| 6,900,365 B2 | * | 5/2005 | Chen et al. | 585/489 |

(Continued)

OTHER PUBLICATIONS

"A Crystal that Traps Pollution from Your Vehicles!," news article printed from *The Times of India*, Nov. 12, 2004.

(Continued)

*Primary Examiner*—Stanley Silverman
*Assistant Examiner*—Paul A Wartalowicz
(74) *Attorney, Agent, or Firm*—Isaac M. Rutenberg; Bozicevic, Field & Francis LLP

(57) ABSTRACT

Molecular sieves and the use of such materials as hydrocarbon traps, particularly for reducing the emissions associated with the combustion of hydrocarbon fuels are described. Specifically, the use of molecular sieves such as zeolites as adsorbents for hydrocarbon gases, especially exhaust gases such as are formed during the combustion of hydrocarbons, and more particularly to the adsorption of hydrocarbon gases formed during the cold start operation of an internal combustion engine is described. In one embodiment, a method of treating exhaust gas that comprises a hydrocarbon combustion product is provided, the method comprising contacting the exhaust gas with a CON topology molecular sieve for a time period effective to facilitate adsorption of the hydrocarbon combustion product by the molecular sieve; passing a purge gas through the molecular sieve to remove adsorbed hydrocarbon combustion product; and contacting the purge gas containing the removed hydrocarbon combustion product with a hydrocarbon conversion catalyst.

34 Claims, 21 Drawing Sheets

U.S. PATENT DOCUMENTS

| | | | |
|---|---|---|---|
| 2001/0031299 A1* | 10/2001 | Full et al. | 426/419 |
| 2002/0164283 A1 | 11/2002 | Jones et al. | |
| 2004/0083716 A1 | 5/2004 | Twigg | |
| 2004/0166036 A1 | 8/2004 | Chen et al. | |
| 2004/0226440 A1 | 11/2004 | Foong et al. | |

OTHER PUBLICATIONS

Adair et al. (1996), "Reactions of Meta-Xylene on Zeolites with Intersecting Medium and Large Pores, I. Basic Studies," *Microporous Materials* 7:261-270.

Baerlocher et al. (2001), *Atlas of Zeolite Framework Types, 5th Revised Edition*, Structure Commission of the International Zeolite Association, Elsevier.

Ball (2004), "Cars Get a Cleaner Start," *BioEd Online*, online article printed from http://www.bioedonline.org/news/news.cfm?art=1124.

Burke et al. (2003), "The Effect of Silica:Alumina Ratio and Hydrothermal Ageing on the Adsorption Characteristics of BEA Zeolites for Cold Start Emission Control," *Applied Catalysis B: Environmental* 46:97-104.

Castañeda et al. (2003), "Synthesis of a New Zeolite Structure ITQ-24, with Intersecting 10- and 12-Membered Ring Pores," *J. Am. Chem. Soc.* 125:7820-7821.

Corma (1998), "Sorption, Diffusion and Catalytic Properties of Zeolites Containing 10- and 12-Member Ring Pores in the Same Structure," *Microporous and Mesoporous Materials* 21:487-495.

Corma et al. (2003), "A Zeolite with Interconnected 8-, 10- and 12-Ring Pores and Its Unique Catalytic Selectivity," *Nature Materials* 2:493-497.

Czaplewski et al. (2002), "One-Dimensional Zeolites as Hydrocarbon Traps," *Microporous and Mesoporous Materials* 56:55-64.

Dartt et al. (1996), "Characterization and Catalytic Activity of Titanium Containing SSZ-33 and Aluminum-Free Zeolite Beta," *Applied Catalysis A: General* 143:53-73.

Davis et al. (1988), "A Molecular Sieve with Eighteen-Membered Rings," *Nature* 331:698-699.

Davis et al. (1992), "Zeolite and Molecular Sieve Synthesis," *Chem. Mater.* 4(4):756-768.

DeHavilland Information Services PLC (2004), "Crystal Sponge to Soak Up Pollution," *Platinum Today*, news article printed from http://www.platinumtoday.net/media_room/1094140802.html, Sep. 2, 2004.

Elangovan et al. (2004), "SSZ-33: A Promising Material for Use as a Hydrocarbon Trap," *The Journal of Physical Chemistry* 108(35):13059-13061.

Elangovan et al. (2004), "SSZ-33—A Promising Material for Use as a Hydrocarbon Trap," *AIChE*, Zeotlite Catalysis Technical Program for Nov. 12, 2004 Meeting, program printed from www.aiche.org.

Jones et al. (1999), "Reactions of $m$-Xylene on Zeolites with Intersecting Medium and Large Pores Part 2: Aluminum Population in Structures with CON Topology," *Microporous and Mesoporous Materials* 28:471-481.

Jones et al. (2001), "Synthesis of Hydrophobic Molecular Sieves by Hydrothermal Treatment with Acetic Acid," *Chem. Mater.* 13:1041-1050.

Kunkeler et al. (1998), "Zeolite Beta: The Relationship Between Calcination Procedure, Aluminum Configuration, and Lewis Acidity," *Journal of Catalysis* 180:234-244.

Lafyatis et al. (1998), "Ambient Temperature Light-Off for Automobile Emission Control," *Applied Catalysis B: Environmental* 18:123-135.

Li et al. (2004), "Zeolites in Catalytic Hydrocarbon Traps for Automotive Emission Control," internet article printed from http://icc2004.catalyse.cnrs.fr/cdrom/p6-134.pdf.

Liu et al. (2001), "FT-IR Spectroscopic Studies of Hydrocarbon Trapping in $Ag^+$-ZSM-5 for Gasoline Engines Under Cold-Start Conditions," *Applied Catalysis B: Environmental* 35:125-136.

Lobo et al. (1993), "SSZ-26 and SSZ-33: Two Molecular Sieves with Intersecting 10- and 12-Ring Pores," *Science* 262:1543-1546.

Marcus et al. (1999), "Going Green with Zeolites," *Chemical Engineering Progress*.

Toby (2001), "Investigations of Zeolitic Materials at the NIST Center for Neutron Research," *Journal of Research of the National Institute of Standards and Technology*:106(6):965-973.

International Search Report for WO 2005/074591.

Gaslain et al. "First Zeolit Carbon Replica with a well resolved X-ray diffraction pattern," Chem. Commun., 2006, pp. 991-993.

http://www.iza-structure.org—accessed Jun. 21, 2010.

http://izasc.ethz.ch/fmi/xsl/IZA-SC/ftc_fw.xsl?-db=Atlas_main&-lay=fw&-max=25&STC=FAU&-find—accessed Jun. 16, 2010.

http://izasc.ethz.ch/fmi/xsl/IZA-SC/ftc_fw.xsl?-db=Atlas_main&-lay=fw&-max=25&STC=CON&-find—accessed Jun. 16, 2010.

* cited by examiner

US 7,858,059 B2

MOLECULAR SIEVES FOR IMPROVED HYDROCARBON TRAPS

CROSS-REFERENCE TO RELATED APPLICATIONS

This application claims priority under 35 U.S.C. §119(e)(1) to U.S. Provisional Patent Application Ser. No. 60/541,109, filed Feb. 2, 2004 and to U.S. Provisional Patent Application Ser. No. 60/555,647, filed Mar. 22, 2004. The disclosures of the aforementioned applications are incorporated by reference in their entireties.

TECHNICAL FIELD

This invention relates generally to molecular sieves and the use of such materials as hydrocarbon traps. Specifically, the invention relates to molecular sieves such as zeolites, and the use of such molecular sieves as adsorbents for hydrocarbon gases, especially exhaust gases such as are formed during the combustion of hydrocarbons, and more particularly to the adsorption of hydrocarbon gases formed during the cold start operation of an internal combustion engine.

BACKGROUND OF THE INVENTION

Future low emissions standards for vehicles are forcing automobile and catalyst manufacturers to focus on reducing cold start hydrocarbon emissions since a large portion of hydrocarbon emissions occur during the cold start period. Consequently, control of emissions during the cold start operation of a vehicle containing an internal combustion engine is essential. Vehicles equipped with a conventional three-way catalytic converter typically contain precious metals supported on a washcoat layer, which in turn is deposited on a monolithic carrier. Fresh catalysts start to operate at about 170° C., while aged catalysts work only at about 200-225° C. These catalysts usually require at least 1-2 min to reach such temperatures, and during this "cold start" period, 70-80% of the tailpipe hydrocarbon emissions occur. Such cold start emissions often result in failure in the cycle of the U.S. federal test procedure (FTP), a standardized laboratory method for new vehicles testing that is based on two simulated environments; namely, city and highway, in which prototypes of new vehicle models are driven by a trained driver in a laboratory on a dynamometer. At lower temperatures where the catalyst in a catalytic converter is not able to effectively convert incompletely burned hydrocarbons to final combustion products, a hydrocarbon adsorber system should trap hydrocarbons exhausted from the engine before they reach the catalytic converter by adsorbing the incompletely burned hydrocarbons. In the ideal case, desorption should occur at temperatures exceeding catalyst light-off.

The critical factors for any emission hydrocarbon trap are the adsorption capacity of the adsorbent, the desorption temperature at which adsorbed hydrocarbons are desorbed and passed to the catalytic converter (must be higher than the catalyst operating temperature), and the hydrothermal stability of the adsorbent. Molecular sieves such as zeolites have generally been found to be useful adsorbents for this application in part due to their hydrothermal stability under these conditions compared to other materials.

Various studies have focused on the use of molecular sieves, and zeolites in particular, as adsorbents, including medium and large pore zeolites, although, in some cases, the types of molecular sieves or zeolites used have not been identified. A series of zeolites (β, ZSM-5, mordenite, and Y) have been investigated in such studies for their hydrocarbon adsorption capacity under a variety of conditions (see, e.g., Burke, N. R.; Trimm, D. L.; Howe, R. F. *Appl. Catal., B* 2003, 46, 97; Lafyatis, D. S.; Ansell, G. P.; Bennett, S. C.; Frost, J. C.; Millington, P. J.; Rajaram, R. R.; Walker, A. P.; Ballinger, T. H. *Appl. Catal., B* 1998, 18, 123; Noda, N.; Takahashi, A.; Shibagaki, Y.; Mizuno, H. *SAE Tech. Pap. Ser.* 1998, 980423; and, Czaplewski, K. F.; Reitz, T. L.; Kim, Y. J.; Snurr, R. Q. *Microporous Mesoporous Mater.* 2002, 56, 55)

Previous investigations have thus far found zeolite-β to be a promising material for this application. However, aged zeolite-β catalysts demonstrate degraded performance in trapping hydrocarbons due to low hydrothermal stability when used as an exhaust gas adsorbent. Hence, despite advances in the art, an important need continues to exist for a material that possesses a better adsorption capacity, higher desorption temperature, and hydrothermal stability than current adsorbents such as zeolite-β for use in emission control, particularly during the cold start operation of an internal combustion engine.

SUMMARY OF THE INVENTION

The present invention is addressed to the aforementioned needs in the art, and provides a novel and improved method for treating an exhaust gas that comprises a hydrocarbon combustion product. In one embodiment, a method of treating exhaust gas that comprises a hydrocarbon combustion product is provided, the method comprising contacting the exhaust gas with a CON topology molecular sieve for a time period effective to facilitate adsorption of the hydrocarbon combustion product by the molecular sieve; passing a purge gas through the molecular sieve to remove adsorbed hydrocarbon combustion product therefrom; and contacting the purge gas containing the removed hydrocarbon combustion product with a hydrocarbon conversion catalyst.

In an alternate aspect, the invention relates to a method of treating an exhaust gas containing at least one hydrocarbon combustion product by contacting the exhaust gas with an adsorbent molecular sieve so that the at least one hydrocarbon combustion product is adsorbed thereby, desorbing adsorbed hydrocarbon combustion product from the molecular sieve, and contacting the desorbed hydrocarbon combustion product with a hydrocarbon conversion catalyst, wherein an improvement in adsorption of the hydrocarbon combustion product and reduced emission of hydrocarbons is realized through the use of a CON topology molecular sieve as the adsorbent molecular sieve.

In another aspect of the invention, a system for treating exhaust gases formed during the combustion of a hydrocarbon is provided, the system comprising an exhaust gas adsorption unit containing an adsorbent CON topology molecular sieve; a catalytic converter unit containing a hydrocarbon conversion catalyst; means for supplying an exhaust gas comprising a hydrocarbon combustion product to the adsorption unit so that the hydrocarbon combustion product is at least partly adsorbed by the molecular sieve; means for transferring the hydrocarbon combustion product from the adsorption unit to the catalytic converter unit wherein the hydrocarbon combustion product is converted to an exhaust emission gas; and means for exhausting the exhaust emission gas from the catalytic converter unit.

DETAILED DESCRIPTION OF THE INVENTION

Figure 1A:
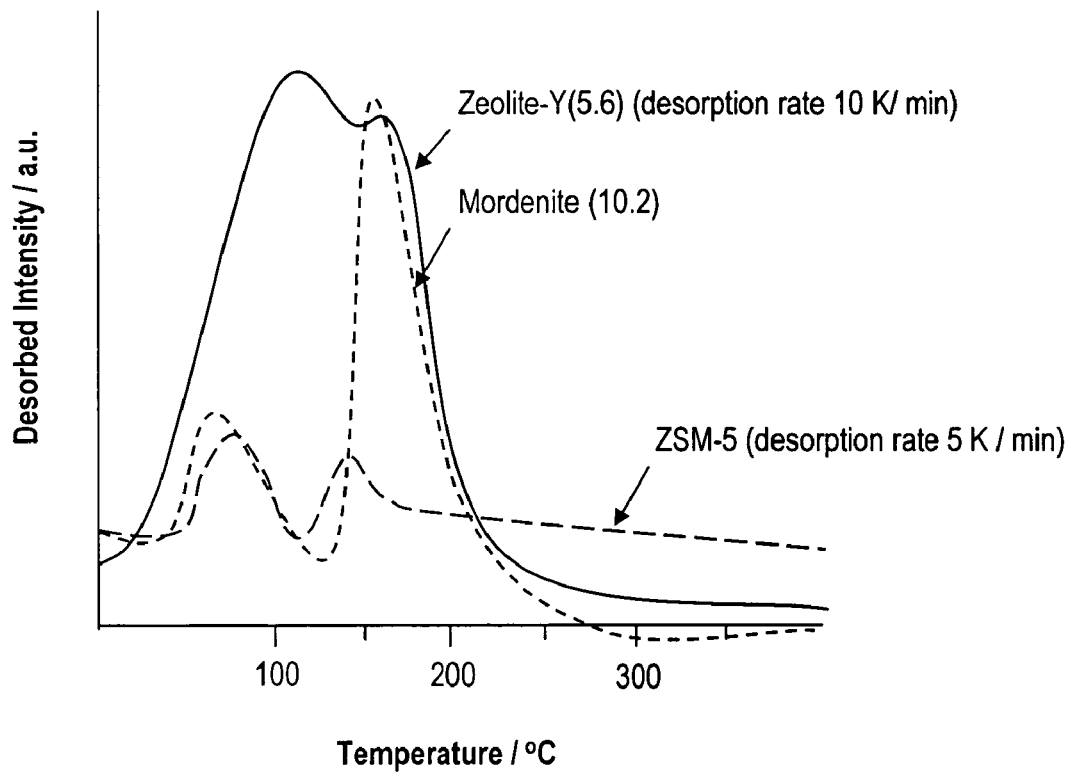
FIGS. 1A and 1B illustrate toluene desorption profiles for certain molecular sieves, as described in Example 1.

It is to be understood that unless otherwise indicated this invention is not limited to specific materials or reactants, reaction conditions, or the like, as such may vary. It is also to be understood that the terminology used herein is for the purpose of describing particular embodiments only and is not intended to be limiting.

In this specification and in the claims that follow, reference will be made to a number of terms, which are intended to have the following meanings:

As used in the specification and the appended claims, the singular forms "a," "an" and "the" include plural referents unless the context clearly dictates otherwise. Thus, for example, reference to "a molecular sieve" or "a hydrocarbon combustion product" encompasses a combination or mixture of different molecular sieves or hydrocarbon combustion product compounds as well as a single molecular sieve or hydrocarbon compound. Similarly, the phrases "a mixture thereof" and "mixtures thereof" includes mixtures of one or more of the same category of referent, as well as mixtures of different referents. For example, the combination of a hydrocarbon combustion product and a molecular sieve is intended to include mixtures of one or more combustion products with one or more molecular sieves, in addition to a mixture of one combustion product and one molecular sieve.

The phrase "characterized by" generally refers to a description of a characteristic or property rather than a particular method of characterizing the property or determining the characteristic. For example, in one aspect as discussed below, the invention may be described in terms of the molecular sieve characteristics in which the CON topology molecular sieve is characterized by an increased adsorption capacity or an increased desorption temperature compared to the non-CON topology molecular sieve. By this it is meant that the CON topology molecular sieve demonstrates such properties without reference to a specific technique for determining the degree of improvement.

The term "CON topology molecular sieve" as used herein refers to molecular sieves known in the art as having the framework structure designated as "CON" by the Nomenclature Committee of the International Zeolite Association (IZA). Similarly, the term "non-CON topology molecular sieve" refers to molecular sieves known in the art as having a framework structure other than those molecular sieves designated as "CON" by the Nomenclature Committee of the International Zeolite Association. Specific detailed information concerning the structure and nomenclature of molecular sieves including CON topology zeolites and other non-CON topology zeolites may be obtained from the Structure Commission of the IZA, or from the IZA website located at http://www.iza-structure.org/databases/.

The phrase "improved adsorption" is not intended to be particularly limited and generally refers to the ability of the CON topology molecular sieve to provide improved adsorption properties relative to a non-CON topology molecular sieve.

The phrase "method of treating exhaust gas" generally refers to a method of reducing the emission of exhaust gas pollutants, particularly those associated with the incomplete combustion of hydrocarbon fuels. While not exclusively limited thereto, the treatment method is primarily directed to reducing the emission of incompletely combusted exhaust gas components, such as occur during the cold start operation of an internal combustion engine.

As noted above, a method of treating exhaust gas that comprises a hydrocarbon combustion product is provided, the method comprising contacting the exhaust gas with a CON topology molecular sieve for a time period effective to facilitate adsorption of the hydrocarbon combustion product by the molecular sieve; passing a purge gas through the molecular sieve to remove adsorbed hydrocarbon combustion product therefrom; and contacting the purge gas containing the removed hydrocarbon combustion product with a hydrocarbon conversion catalyst. Although the use of adsorbent materials in exhaust gas systems is generally known, the present invention provides an improvement over the use of such prior adsorbents due to the use of an adsorbent material that comprises a CON topology molecular sieve.

The method may be applied as a batch process in which the adsorbent is contacted with the exhaust gas batchwise or as a continuous or semi-continuous process in which the exhaust gas continuously or semi-continuously flows through the molecular sieve. For example, the method may be applied as a continuous process for purifying the exhaust gas from an internal combustion engine in which a hydrocarbon fuel is combusted. In such a continuous process, the exhaust gas may be first passed from the source, such as from an internal combustion engine, to an adsorbent molecular sieve having a CON topology, so that components in the exhaust gas, particularly hydrocarbons, are adsorbed by the molecular sieve. Depending on the application, the adsorbed components are typically subsequently desorbed from the molecular sieve and brought into contact with a catalyst. In the case of an exhaust gas purification system, the CON topology molecular sieve may be utilized to adsorb partially combusted hydrocarbon components from the exhaust gas of an internal combustion engine by contacting the molecular sieve with the exhaust gas upstream of a catalytic converter. As the molecular sieve and the catalyst subsequently heat up due to continued throughflow of the exhaust gas, the components adsorbed onto the molecular sieve are desorbed into the exhaust gas stream and passed on to the converter. The desorbed hydrocarbon components are then converted by the catalyst due to the improved hydrocarbon conversion efficiency of the catalyst at higher operating temperatures.

The method of the invention may also be carried out sequentially and continuously with a flowing exhaust gas, that is, wherein the exhaust gas continuously flows through the molecular sieve and then through a downstream catalytic converter. In this regard, the exhaust gas may also essentially function as the purge gas for removing exhaust components desorbed from the molecular sieve. A separate purge gas stream, or a separate purge gas stream in conjunction with the exhaust gas stream, may also be used to remove the desorbed exhaust gas components, including, without limitation, air such as secondary air that is added to the exhaust gas stream, an inert gas, or a mixture thereof.

The use of the CON topology molecular sieve in batch and semi-continuous systems is also within the scope of the invention. For example, in a batch process the CON topology molecular sieve may be contacted with a portion of the exhaust gas such that the exhaust gas components, particularly incompletely combusted hydrocarbon components produced during cold start operation of an internal combustion engine, are adsorbed onto the molecular sieve. Thereafter, when the operating temperature of a catalyst such as in a catalytic converter has been reached, the adsorbed components may be purged using a purge gas and passed to the catalyst for conversion to exhaust gas emission products. Similarly, in a semi-continuous process, the exhaust gas may be initially passed through the molecular sieve and subsequently through a downstream catalyst. After a period of time (e.g., when the catalyst light-off temperature is reached), the exhaust gas may be re-directed to pass only through the catalyst, such that the molecular sieve is bypassed. A purge gas such as air may then be passed through the molecular sieve to desorb the exhaust gas components adsorbed onto the molecular sieve.

Although the molecular sieve may be utilized to adsorb exhaust gas components by itself, it may also be utilized in an adsorbent material that comprises the molecular sieve along with additional materials such as binders and clays. The adsorbent material may also comprise one or more catalysts in conjunction with the molecular sieve. Such catalysts are generally known in the art and are not specifically limited for use herein in conjunction with the adsorbent material. Other adsorbent materials may also be included along with the CON topology molecular sieve if desired, including without limitation molecular sieves other than CON topology molecular sieves, such as, e.g., SSZ-23, SSZ-31, SSZ-35, SSZ-37, SSZ-41, SSZ-42, SSZ-43, SSZ-44, SSZ-45, SSZ-47, SSZ-48, SSZ-53, SSZ-54, SSZ-55, SSZ-57, SSZ-58, SSZ-59, SSZ-60, SSZ-63, SSZ-64, SSZ-65, and mixtures thereof.

In general, any molecular sieve having a CON topology is intended to be suitable for use in the invention. While not intended to be limited thereto, suitable examples of CON topology molecular sieves include, in one embodiment, silicate molecular sieves such as SSZ-33, SSZ-26, CIT-1, ITQ-24, and mixtures thereof. The structural characteristics, x-ray diffraction pattern data, and methods for preparing these molecular sieves are described in numerous publications and patents and need not be detailed herein. See, e.g., U.S. Pat. No. 4,910,006 (for SSZ-26 to Zones et al.); U.S. Pat. No. 4,963,337 (for SSZ-33 to Zones et al.); U.S. Pat. No. 5,512,267 (for CIT-1 to Davis et al.); Jones, C. W.; Zones, S. I.; Davis, M. E.; *Microporous and Mesoporous Materials*, 1999, 28, 471; and, Castaneda, R.; Corma, A.; Fornes, V.; Rey, F.; Rius, J.; *J. Am. Chem. Soc.* 2003, 125, 7820 (for ITQ-24).

As in known in the art, CON topology molecular sieves contain 10- and 12-membered ring (MR) pores in which the 10- and 12-MR channels intersect and connect to form a large void volume at the intersections. While not intending to be bound thereby, it is believed that the porosity of CON topology molecular sieves provides beneficial adsorption properties, in part since transport of diffusing molecules can occur in the 12-ring pore system, the 10-ring pores, or in both types of pores. As discussed in the Examples provided below, such beneficial characteristics are demonstrated over non-CON topology molecular sieves, particularly over zeolite-$\beta$, zeolite-Y, mordenite, and ZSM-5 measured under the same conditions and according to the same hydrothermal treatment.

In an alternate embodiment, the CON topology molecular sieve is selected to provide improved adsorption of the hydrocarbon combustion product compared to a non-CON topology molecular sieve before and/or after the same hydrothermal treatment of the CON topology molecular sieve and the non-CON topology molecular sieve. While not necessarily limited thereto, such hydrothermal treatments are generally intended to simulate the conditions experienced in an exhaust gas emission system. For example, as discussed in the examples, suitable hydrothermal treatment of the CON topology molecular sieve and the non-CON topology molecular sieve may be carried out in the presence of 10 wt. % water vapor at 800° C. for about 5 hours in a stream of air at 25 mL/min.

The improved adsorption of the hydrocarbon combustion product by the CON topology molecular sieve may be demonstrated by a number of beneficial adsorption characteristics of the CON topology molecular sieve. For example, in one embodiment, the improved adsorption may be characterized by an increased adsorption capacity or an increased desorption temperature compared to the non-CON topology molecular sieve. The CON topology molecular sieve may, of course, also demonstrate both an increased adsorption capacity and an increased desorption temperature compared to the non-CON topology molecular sieve. In particular, in one aspect, the increased adsorption capacity of the CON topology molecular sieve may be at least 1.1 times the adsorption capacity of the non-CON topology molecular sieve, more particularly, at least 1.2 times the adsorption capacity of the non-CON topology molecular sieve, and still more particularly, at least 1.25 times the adsorption capacity of the non-CON topology molecular sieve.

The CON topology molecular sieve may comprise a framework heteroatom such as Al, B, Ga, Fe, Zn, Mg, Co, and mixtures thereof in addition to Si. The CON topology molecular sieve may also contain a metal cation selected from rare earth, Group 2 metals, Groups 8-10 metals, and mixtures thereof, e.g., the metal cation may be selected from Mn, Ca, Mg, Zn, Cd, Pt, Pd, Ni, Co, Ti, Al, Sn, Fe, Co, and mixtures thereof.

In an alternate embodiment, the CON topology molecular sieve comprises a CON topology molecular sieve that contains a metal selected from Cu, Ag, Au and mixtures thereof. For example, a CON topology molecular sieve such as SSZ-33 may at least partially contain Ag incorporated by exchange (e.g., designated as Ag-SSZ-33) according to techniques described in the art. See, e.g., Liu, X.; Lampert, J. K.; Arendarskiia, D. A.; Farrauto, R. J.; *Applied Catalysis B: Environmental* 2001, 35, 125.

CON topology silicate molecular sieves such as CON topology zeolites may also include other partial replacement atoms for Si such as Ge. Techniques for replacing Si with Ge are known in the art, e.g., as described by Zones et al. in a number of patents (see U.S. Pat. Nos. 4,910,006 and 4,963,337). While not necessarily limited thereto, such silicate molecular sieves may be generally classified as high silica molecular sieves, i.e., silicates in which the ratio of Si to Al, Si/Al>5.

Exhaust gases produced from the combustion of a hydrocarbon fuels in an internal combustion engine contain a plurality of combustion components, typically including linear and branched chain non-aromatic hydrocarbons, cycloaliphatic hydrocarbons, aromatic hydrocarbons, polycyclic hydrocarbons and mixtures thereof, as well as non-hydrocarbon components such as carbon dioxide, water, nitrogen oxides and sulfur dioxide. Included within such emissions compounds are aromatic hydrocarbons such as toluene, xylene, benzene and mixtures thereof; linear and branched hydrocarbons such as methane, ethane, ethylene, propane, propylene, butane, pentane, hexane, heptane, octane; cycloaliphatic hydrocarbons such as cyclohexane; and additional fuel additives such as alcohols and methyl tertiary butyl ether (MTBE). The method of the invention may be advantageously utilized to reduce such hydrocarbon emissions, particularly during cold start operation of an internal combustion engine, without being necessarily limited to a particular hydrocarbon fuel. Typical hydrocarbon fuels benefiting from the present invention include gasolines, diesel fuels, aviation fuels, and the like.

As noted, the invention also relates to an exhaust system for treating exhaust gases formed during the combustion of a hydrocarbon. While a number of configurations are possible in which a CON topology molecular sieve is utilized as the hydrocarbon adsorbent, in general the exhaust system comprises an exhaust gas adsorption unit containing an adsorbent CON topology molecular sieve; a catalytic converter unit containing a hydrocarbon conversion catalyst; means for supplying an exhaust gas comprising a hydrocarbon combustion product to the adsorption unit so that the hydrocarbon combustion product is at least partly adsorbed by the molecular sieve; means for transferring the hydrocarbon combustion product from the adsorption unit to the catalytic converter unit wherein the hydrocarbon combustion product is converted to an exhaust emission gas; and means for exhausting the exhaust emission gas from the catalytic converter unit.

Both the adsorption unit and the catalytic converter may be any suitable devices known in the art, provided the adsorbent material contained in the adsorption unit comprises a CON topology molecular sieve. Without limitation, any catalyst suitable for converting incompletely combusted fuel products to final exhaust gas emission products such as water and carbon dioxide may be used. Suitable means for transferring the hydrocarbon combustion product from the adsorption unit to the catalytic converter and for exhausting the exhaust emission gas from the catalytic converter unit generally include any known device used in exhaust gas systems. Although any suitable material may be utilized, in the area of vehicle exhaust gas systems such devices typically are metal or other piping and tubes, and the like.

It is to be understood that while the invention has been described in conjunction with certain specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees C and pressure is at or near atmospheric.

All materials used were either prepared according to procedures detailed in the literature or were obtained from commercially-available sources. Zeolites β ($SiO_2/Al_2O_3$ ratio of 100, abbreviated below as "zeolite-β(100)"), mordenite ($SiO_2/Al_2O_3$ ratio of 10.2, abbreviated below as "mordenite (10.2)"), and ZSM-5 ($SiO_2/Al_2O_3$ ratio of 23.8, abbreviated below as "ZSM-5 (23.8)") were obtained from Tosoh Corporation and zeolite Y ($SiO_2/Al_2O_3$ ratio of 5.6, abbreviated below as "zeolite-Y (5.6)") was supplied by Catalysts & Chemicals Ind. Co., Ltd. All materials used in this study were in the H-form, and they were obtained by a 3-fold ion-exchange with 0.1 M ammonium nitrate solution.

SSZ-33 was synthesized, and posttreatment was carried out according to the procedure reported in the literature (see, e.g., Dartt, C. B.; Davis, M. E. *Appl. Catal., A* 1996, 143, 53). After the treatment, the $SiO_2/Al_2O_3$ ratio was found to be 60.

The temperature-programmed desorption (TPD) of toluene was used to investigate the desorption characteristics of zeolites and was carried out by using a gas chromatograph (GC from Shimadzu model GC-9A) with a thermal conductivity detector (TCD). A sample of ca. 50 mg was placed in a quartz tube of 4 mm i.d., between quartz wool. Subsequently, the sample was activated in a flow of helium at 300° C. for about 2 h. After cooling the column to a temperature of 50° C., toluene was injected using a pulse method with 2 μL pulses until saturation. Desorption was performed by a 90° C. hold method in which the column was heated from 50 to 90° C. at a heating rate of 20K/min and maintained at the same temperature for about 10 min to desorb weakly adsorbed toluene. Subsequently, the samples were heated to 390° C. at the rate of 20K/min and kept at 390° C. for an additional 10 min and then cooled to room temperature. All the TPD experiments were carried out under a flow of helium with a flow rate of 50 mL/min.

Example 1

Toluene Desorption Profiles for Zeolite-Y(5.6), Mordenite (10.2), ZSM-5, Zeolite-β and SSZ-33

Figure 1B:
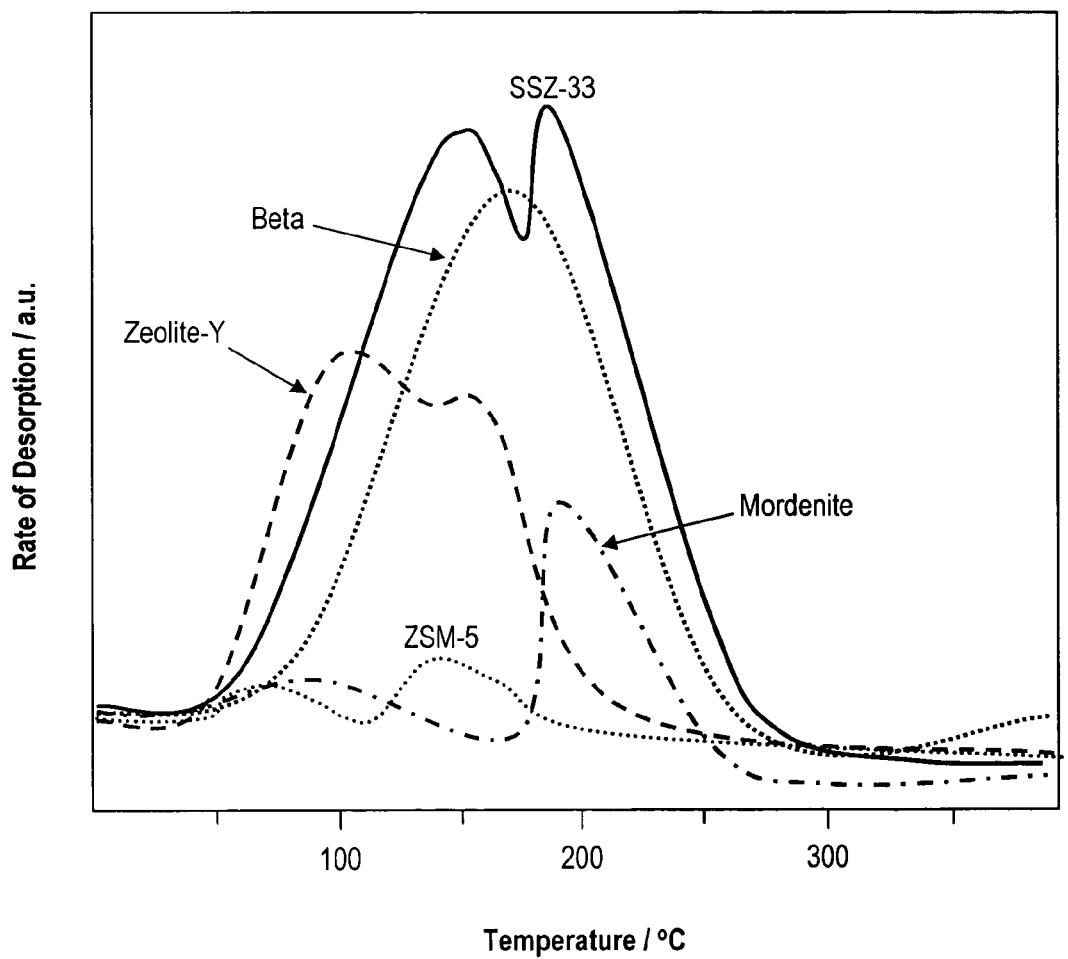

The toluene desorption for zeolite-Y ($SiO_2/Al_2O_3$ ratio of 5.6), Mordenite ($SiO_2/Al_2O_3$ ratio of 10.2) and ZSM-5 were carried out according to the TPD procedures described above at a rate of 5K/min. As shown in FIG. 1A, the toluene desorption profiles for these zeolites vary from a low desorption rate for ZSM-5 to higher rates for zeolite-Y(5.6) and Mordenite (10.2). However, all of zeolites Zeolite Y, ZSM-5, and mordenite desorb toluene at a relatively low temperature. In FIG. 1B, SSZ-33 demonstrated desorption characteristics superior in performance 33 over the other zeolites used. The end temperature of toluene desorption decreases in the following order; SSZ-33>β>mordenite>Y>ZSM-5. Without wising to be bound by such possible conclusions, in comparison to the materials used in this study, SSZ-33 shows an enhanced high-temperature desorption over the other zeolites that may be ascribed to the larger amount of toluene adsorbed. In particular, SSZ-33 exhibits two sharp maxima at ca. 150 and 200° C. It is possible that this behavior may be ascribed to the unique pore system of SSZ-33 in which desorption from the 10-MR (multi-ring) channel occurs at a relatively higher temperature, but further studies are needed in order to understand the reasons for this behavior. From these results, SSZ-33 and zeolite-β were chosen for a more detailed comparison of the adsorption characteristics and zeolite hydrothermal stability.

Example 2

Toluene Desorption Profiles for Zeolite-β(1540), zeolite-β(40), and zeolite-β(100)

Figure 2:
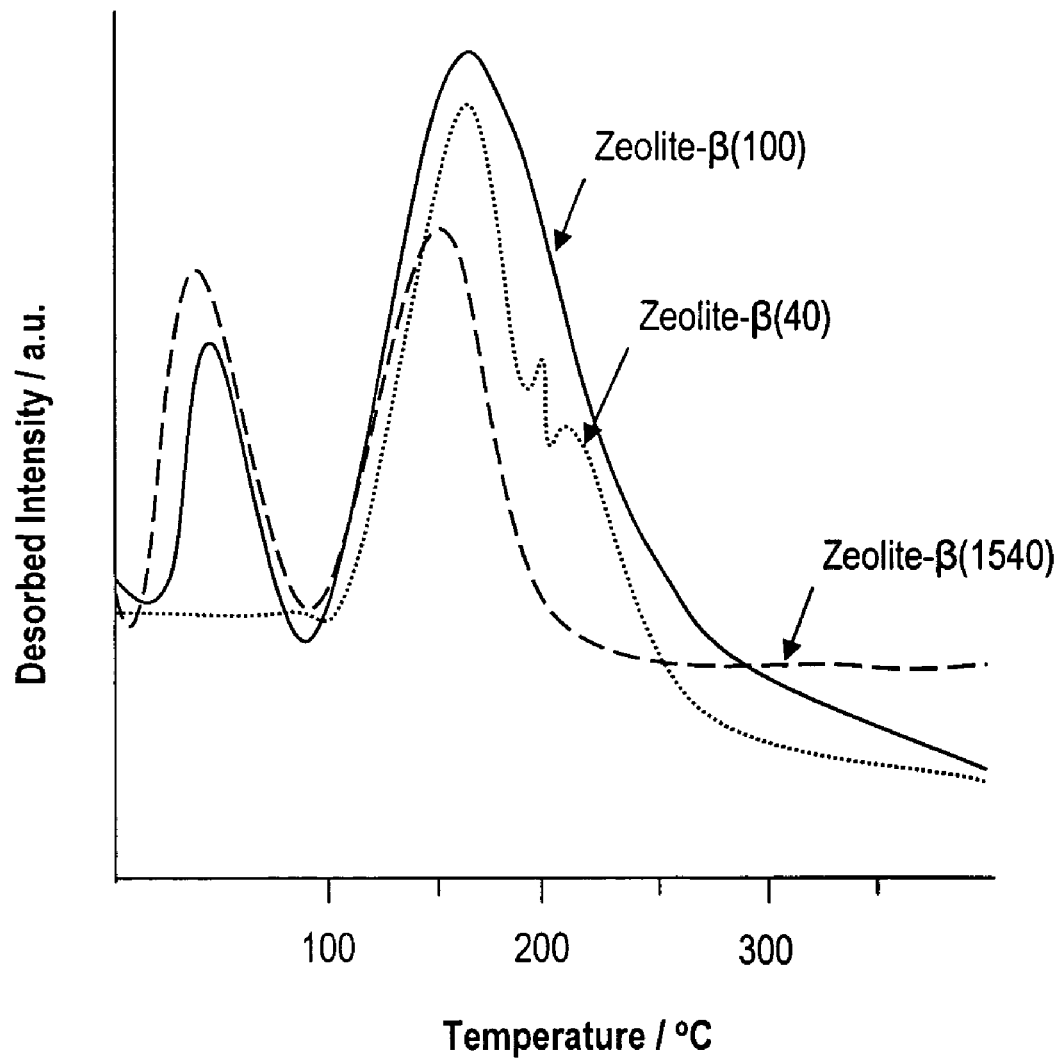
FIG. 2 depicts the toluene desorption profile for zeolite-β (1540), zeolite-β(40), and zeolite-β(100) as a function of temperature, as described in Example 2.

In order to better understand the toluene desorption characteristics of zeolite-β, the toluene TPD behavior of three beta zeolites having different $SiO_2/Al_2O_3$ ratios were studied as described above. As shown in FIG. 2, the toluene desorption profile for zeolite-β(1540), zeolite-β(40), and zeolite-β(100) as a function of varies with the $SiO_2/Al_2O_3$ ratios (listed in parentheses). From this information, zeolite-β(100) was chosen as a comparison standard over the other beta zeolites since the adsorption capacity and end desorption temperature are both superior to the other two beta zeolites.

Example 3

Hydrothermal Treatment Effect on Toluene Desorption Profiles for Zeolite-β(100) and SSZ-33

Figure 3:
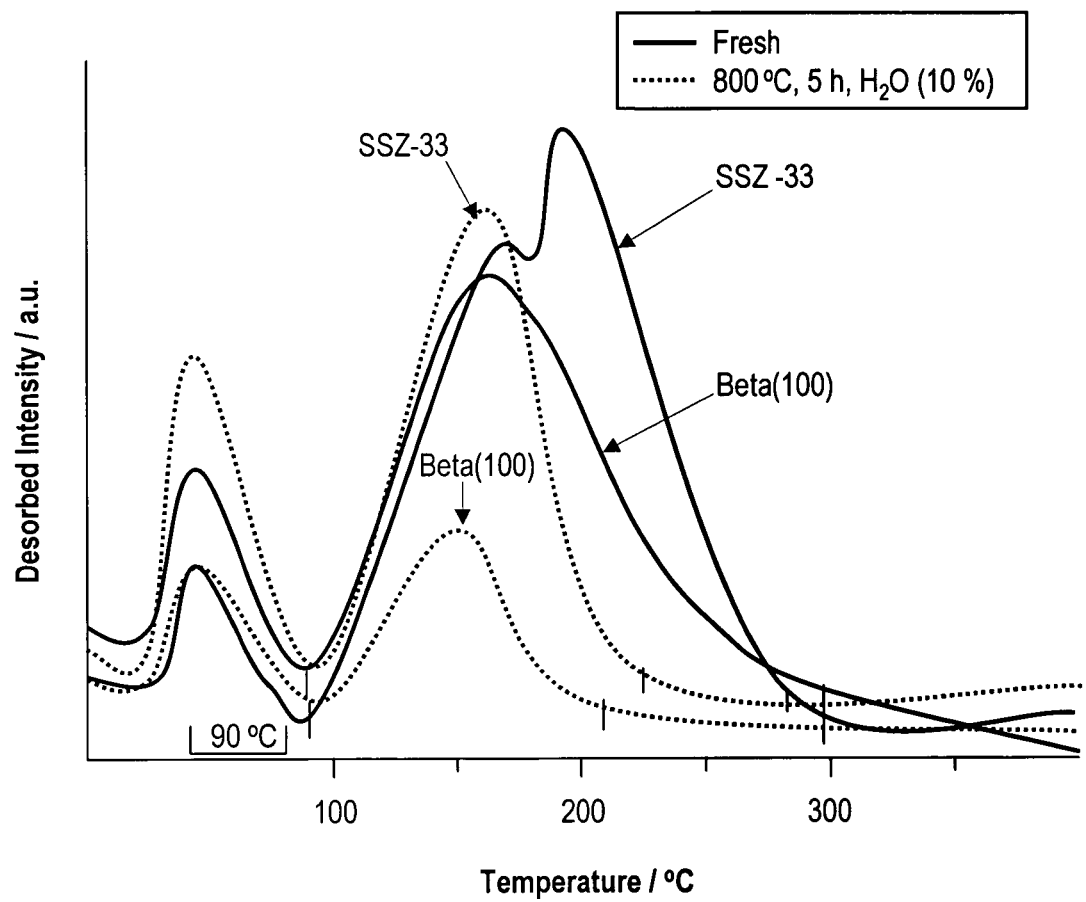
FIG. 3 provides a comparison between the toluene desorption characteristics for fresh, non-aged zeolite-β and SSZ-33 and the same zeolites hydrothermally aged in 10 wt. % water vapor at 800° C. for about 5 hours.

As described above, the TPD toluene desorption profiles for SSZ-33 and zeolite-β(100) were determined for samples before and after hydrothermal treatment (10 wt. % water vapor at 800° C. for about 5 hours). As shown in FIG. 3, both unaged (fresh) and hydrothermally treated SSZ-33 provided superior desorption characteristics, specifically SSZ-33 and the same zeolites hydrothermally aged in 10 wt. % water vapor at 800° C. for about 5 hours.

Example 4

X-Ray Powder Diffraction of Zeolite-β(100) and SSZ-33

Figure 4:
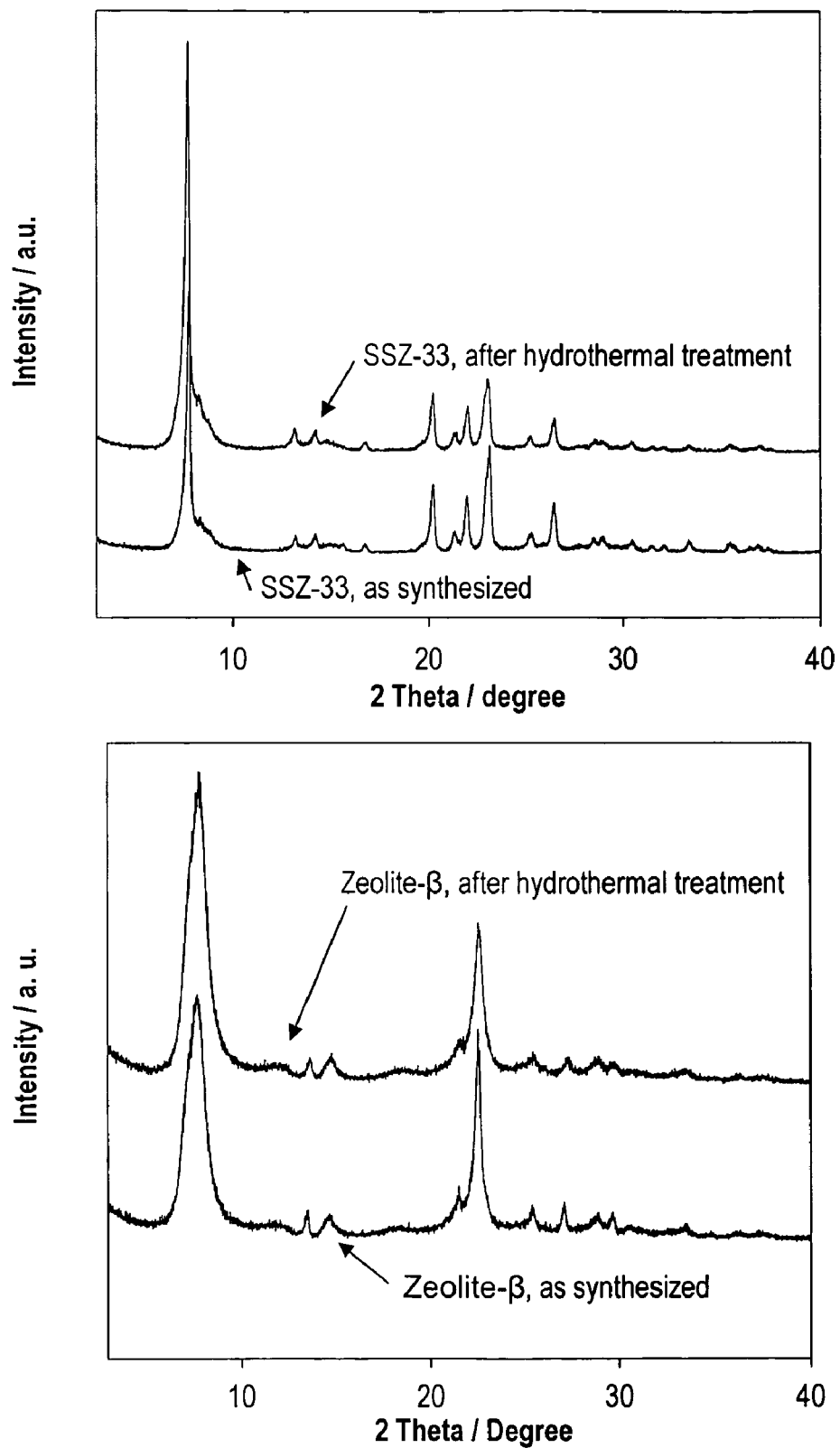
FIG. 4 depicts X-ray powder diffraction patterns for SSZ-33 and zeolite-β(100) before and after hydrothermal treatment.

The X-ray powder diffraction patterns of zeolite-β(100) and SSZ 33 were obtained as shown in FIG. 4 for SSZ-33 and zeolite-β(100) before and after hydrothermal treatment. From these patterns, little or no change was seen implying that no significant structural changes occurred in the zeolites due to the hydrothermal treatment.

Example 5

Figure 5:
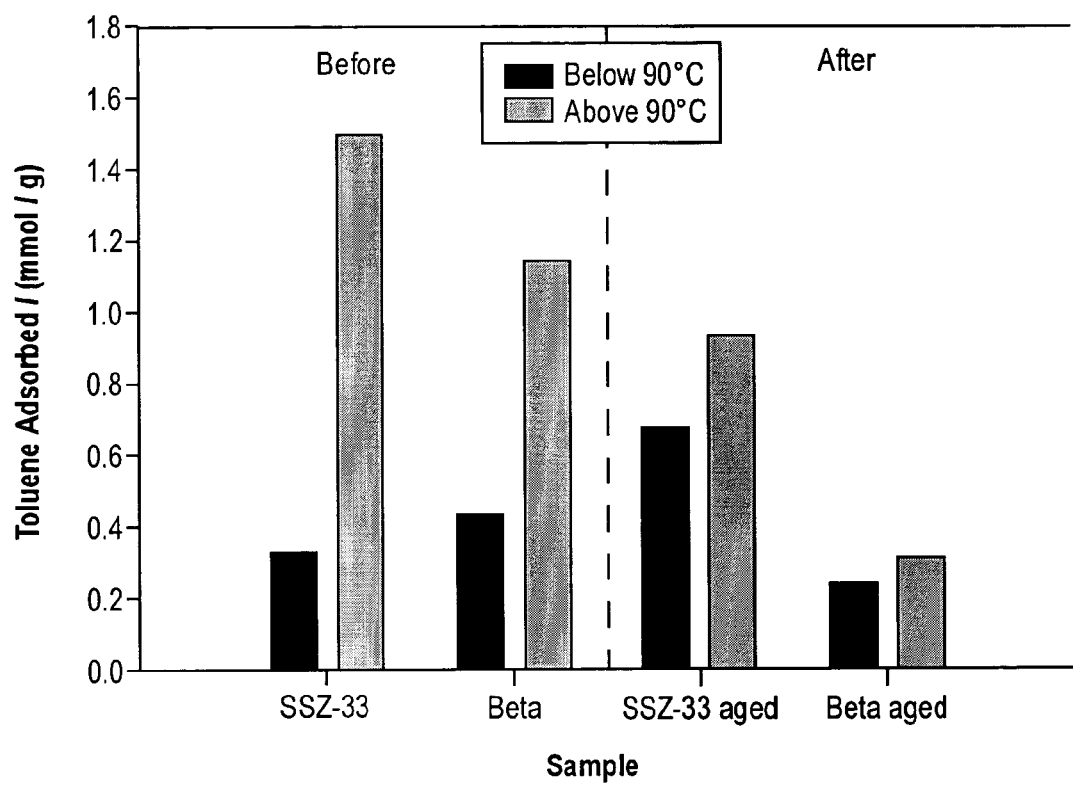
FIG. 5 illustrates the toluene desorption capacity for SSZ-33 and zeolite-β before and after hydrothermal treatment.

Toluene Adsorption Capacity for SSZ 33 and Zeolite-β Before and After Hydrothermal Treatment The toluene adsorption capacity of SSZ 33 and zeolite-β was also determined as shown in FIG. 5 for samples before and after hydrothermal treatment (according to the conditions described above). From this figure, the toluene desorption capacity of SSZ-33 is superior to zeolite-β both before and after hydrothermal treatment, in particular the capacity of SSZ-33 is about 1.25 times larger than that of zeolite-β. The capacity and the desorption temperature of SSZ-33 are superior to those of zeolite-β when considering the requirements in a hydrocarbon cold trap application. There is a decrease in the adsorption capacity after hydrothermal treatment of SSZ-33. The total amount desorbed from the fresh SSZ-33 is 1.82 mmol/g and is decreased to 1.60 mmol/g after the hydrothermal treatment. By comparison with zeolite-β, the desorption from a fresh sample amounts to 1.49 mmol/g, while after the hydrothermal treatment it is only 0.56 mmol/g.

Table 1 presents the micropore volume of these samples as measured by nitrogen adsorption. SSZ-33 possesses a micropore volume of 0.21 $cm^3/g$ which is not decreased after hydrothermal treatment while for zeolite-β the micropore volume is decreased to 0.16 $cm^3/g$ from 0.20 $cm^3/g$.

TABLE 1

Sample Micropore Volume and Crystal Size

| sample | Micropore Volume ($cm^3/g$) | Crystal Size (as determined by SEM) (μm) |
| --- | --- | --- |
| SSZ-33 | 0.21 | 1-2 |
| SSZ-33, aged | 0.21 | |
| zeolite-β | 0.20 | <1 |
| zeolite-β, aged | 0.16 | |

Example 6

Hydrothermal Treatment of Zeolite-β(100) and SAPO-5 at Different Temperatures

Figure 6:
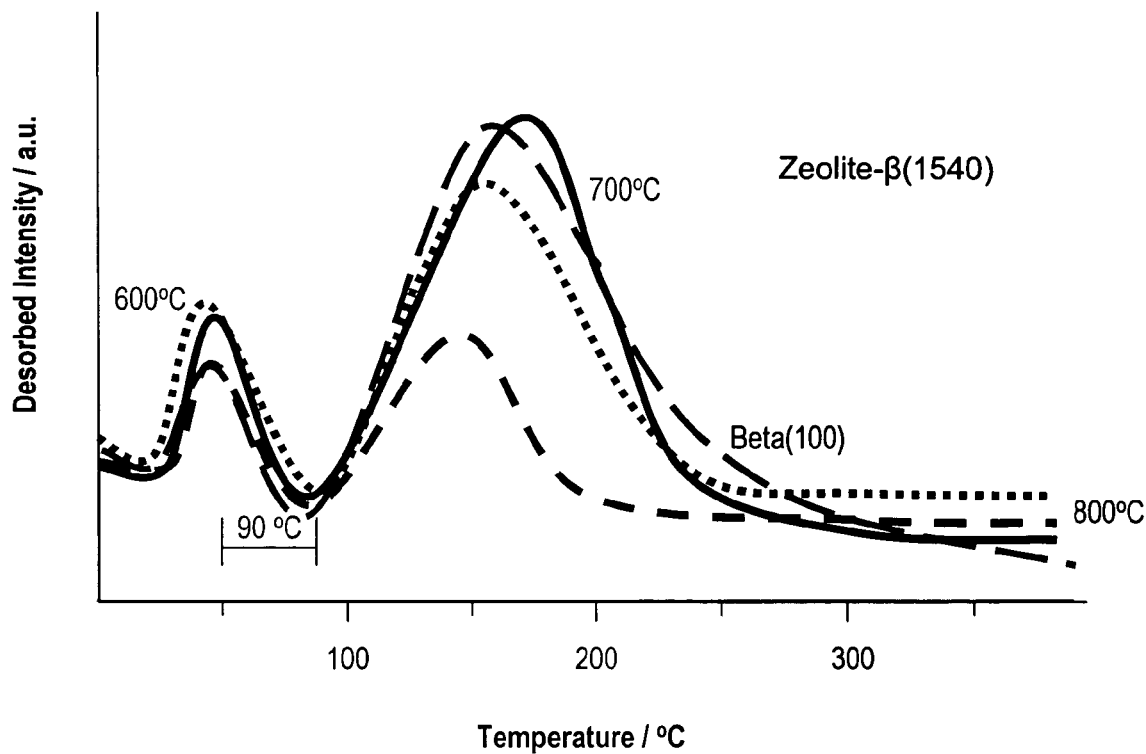
FIG. 6 shows the effects of differing temperature hydrothermal treatment conditions on the toluene desorption characteristics of zeolite-β(100).
Figure 7:
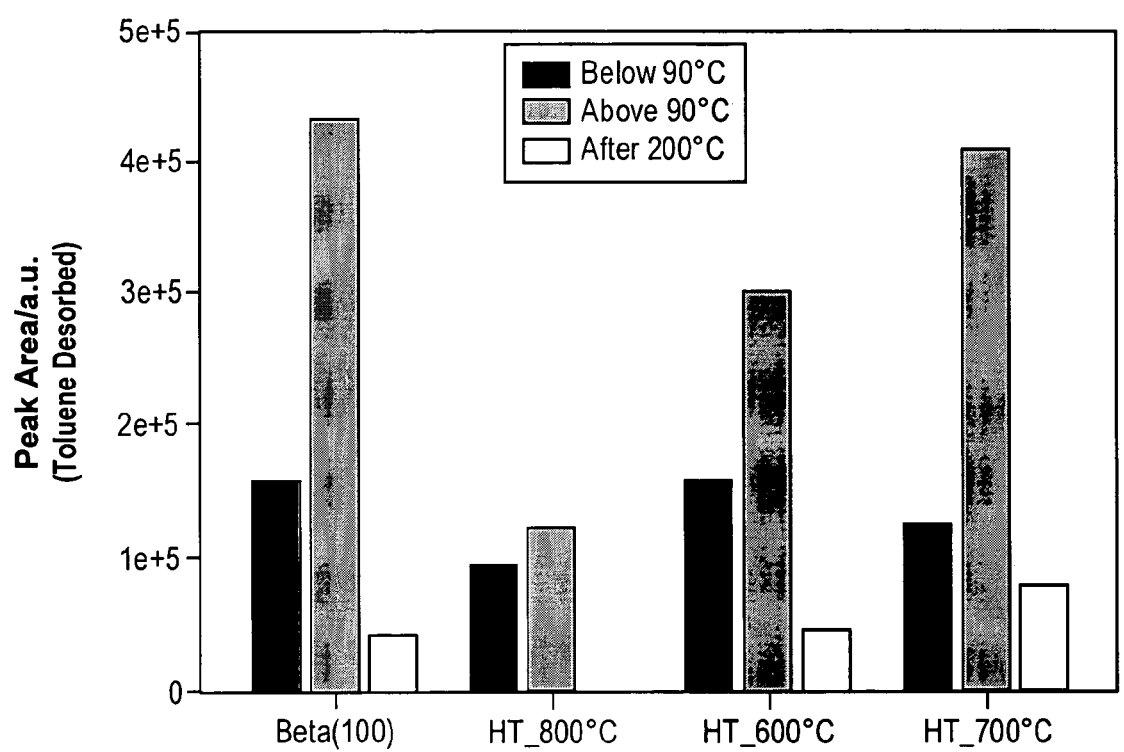
FIG. 7 shows the amount of toluene desorbed over zeolite-β(100) hydrothermally treated at different temperatures.
Figure 8:
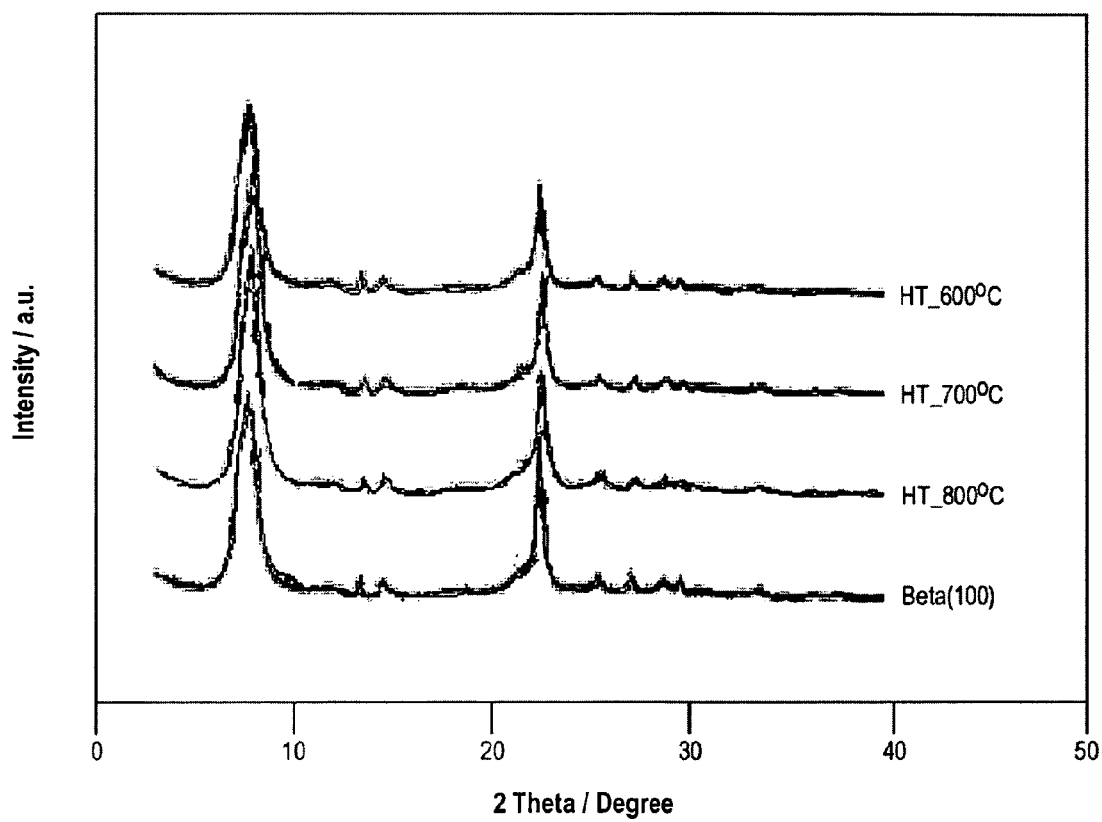
FIG. 8 depicts X-ray powder diffraction patterns for zeolite-β(100) hydrothermally treated at different temperatures.
Figure 9:
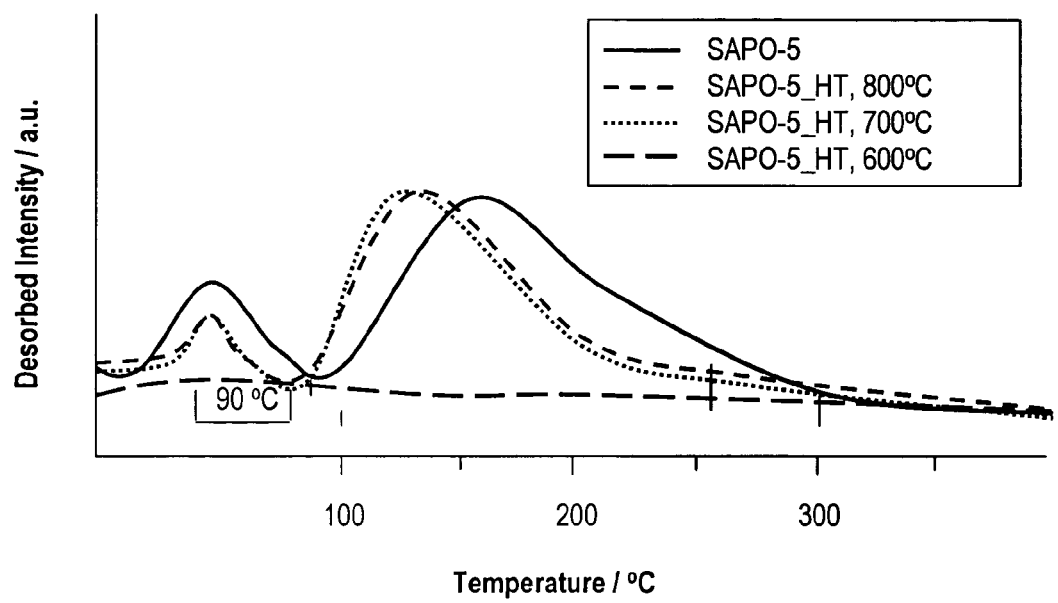
FIG. 9 illustrates the toluene desorption profiles of SAPO-5 hydrothermally treated at different temperatures.

The toluene desorption characteristics of zeolite-β(100) were further determined by hydrothermally treating zeolite-β at different temperatures (600, 700 and 800° C. under the above conditions of water vapor and treatment times) as shown in FIG. 6. From this figure, hydrothermal treatment at 700° C. exhibits better desorption performance than the zeolite-β(100) treated at 600° C. FIG. 7 also shows the toluene adsorption capacity of zeolite-β(100) at different temperatures (600, 700 and 800° C. under the above conditions of water vapor and treatment times). FIG. 8 further provides the X-ray powder diffraction patterns for zeolite-β(100) treated at the different temperatures and shows that no significant structural changes occurred in the samples due to the hydrothermal treatment. FIG. 9 illustrates the toluene desorption profiles of SAPO-5 hydrothermally treated also at different temperatures (600, 700 and 800° C. as above).

Figure 10:
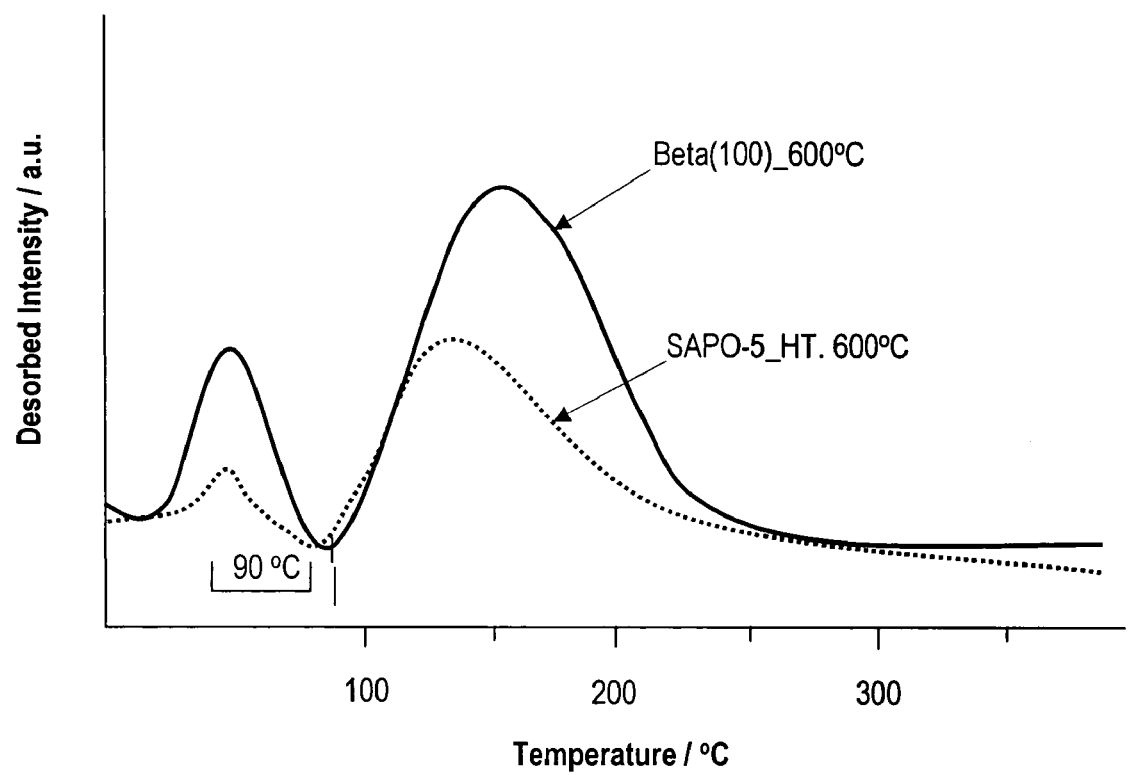
FIG. 10 depicts the toluene desorption profile for zeolite-β(100) and SAPO-5 hydrothermally treated at 600° C.
Figure 11:
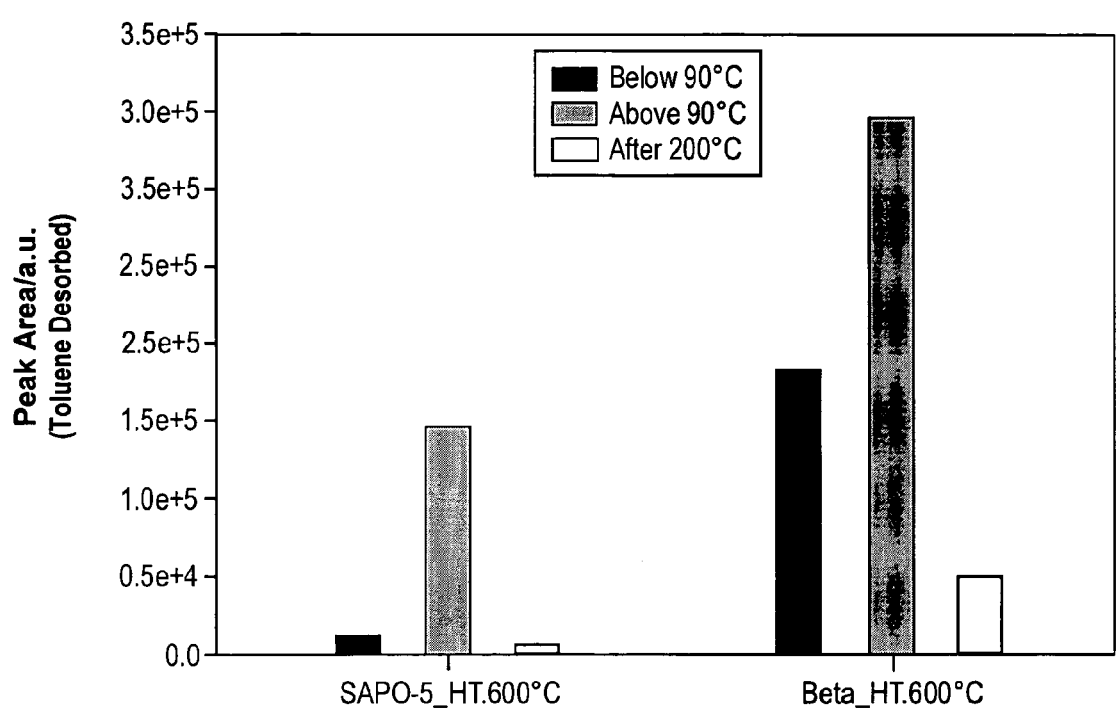
FIG. 11 shows a comparison of the amount of toluene desorbed over zeolite-β(100) and SAPO-5 for samples hydrothermally treated at 600° C.

FIG. 10 further depicts the toluene desorption profile for zeolite-β(100) and SAPO-5 hydrothermally treated at 600° C., and FIG. 11 shows the desorbed amount of toluene for each of these zeolites, indicating that zeolite-β(100) provides better adsorption capacity and desorption performance than SAPO-5.

Example 7

Figure 12:
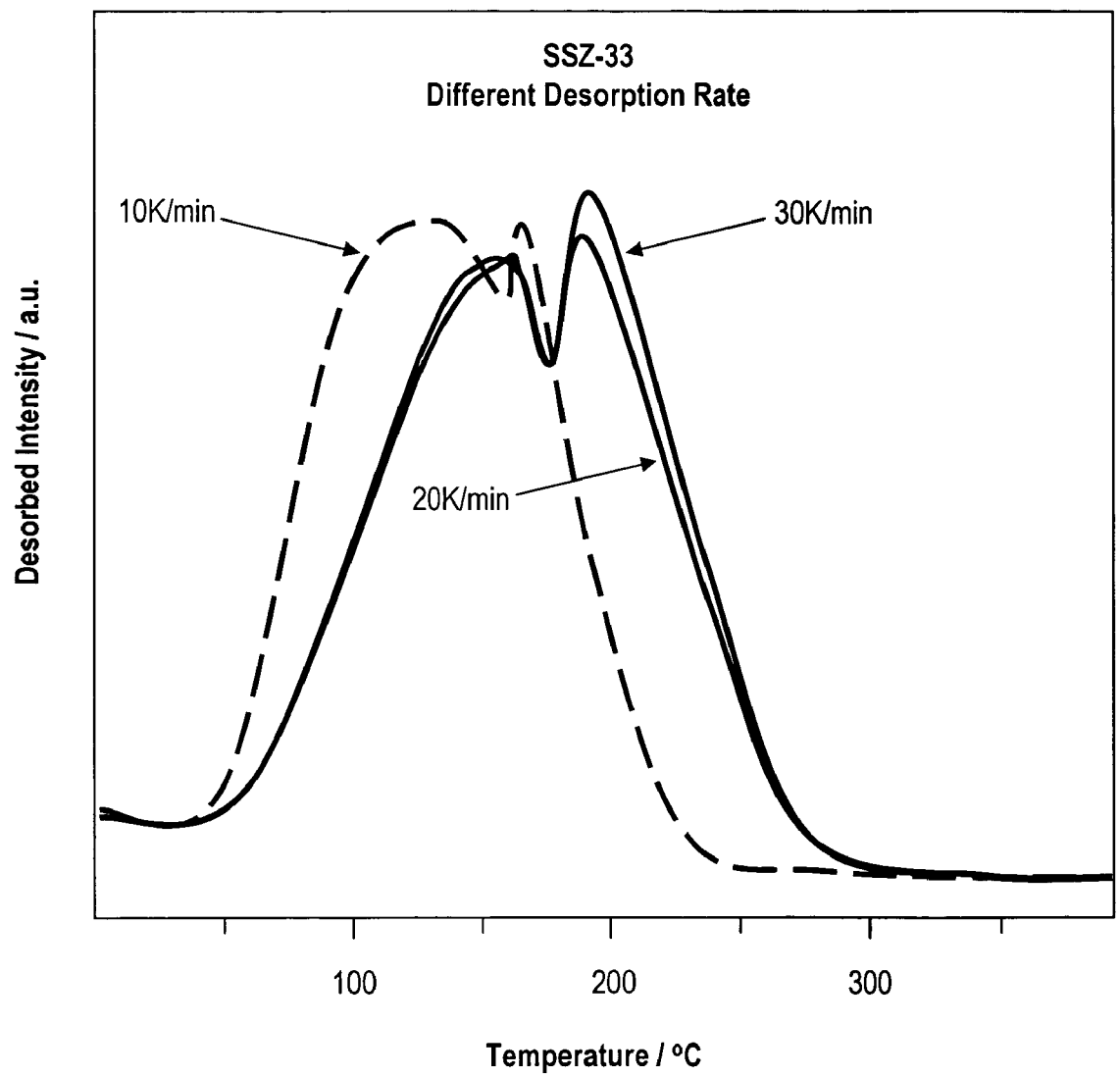
FIG. 12 illustrates the toluene desorption profile of SSZ-33 at different desorption rates.
Figure 13:
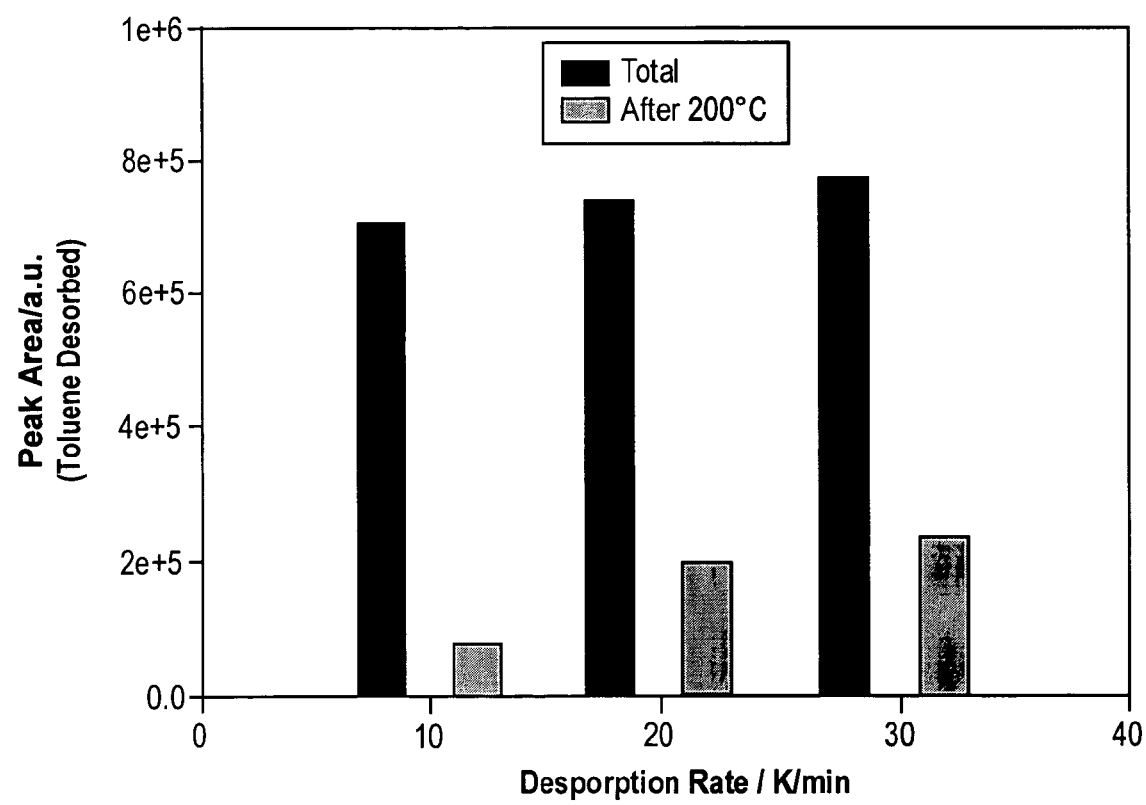
FIG. 13 illustrates the amount of toluene desorbed over SSZ-33 at different desorption rates.

Comparison of Desorption Characteristics of SSZ33 at Different Desorption Rates FIGS. 12 and 13 present the results of an investigation of the desorption characteristics of SSZ-33 at different desorption rates, respectively, the desorption profile and the desorption capacity. From these figures, the toluene desorption temperature is observed to increase with the increase in the rate of desorption.

Example 8

Desorption Characteristics of SSZ33, Zeolite-β(100), and SAPO-5 with Ag Exchanged Zeolites Because the incorporation of Ag may lead to an increase in hydrocarbon adsorption in zeolites, the desorption characteristics of Ag exchanged zeolite compared to the unmodified zeolite was investigated. Silver exchange over zeolite-β(100), SSZ-33, and SAPO-5 was carried out by a conventional ion-exchange method by combining 1 g $AgNO_3$ with 100 g $H_2O$ and 1 g sample under stirring for 24 hr at 80° C., followed by filtering and rinsing, drying, and heating at 400° C. in a flow of nitrogen.

Figure 14:
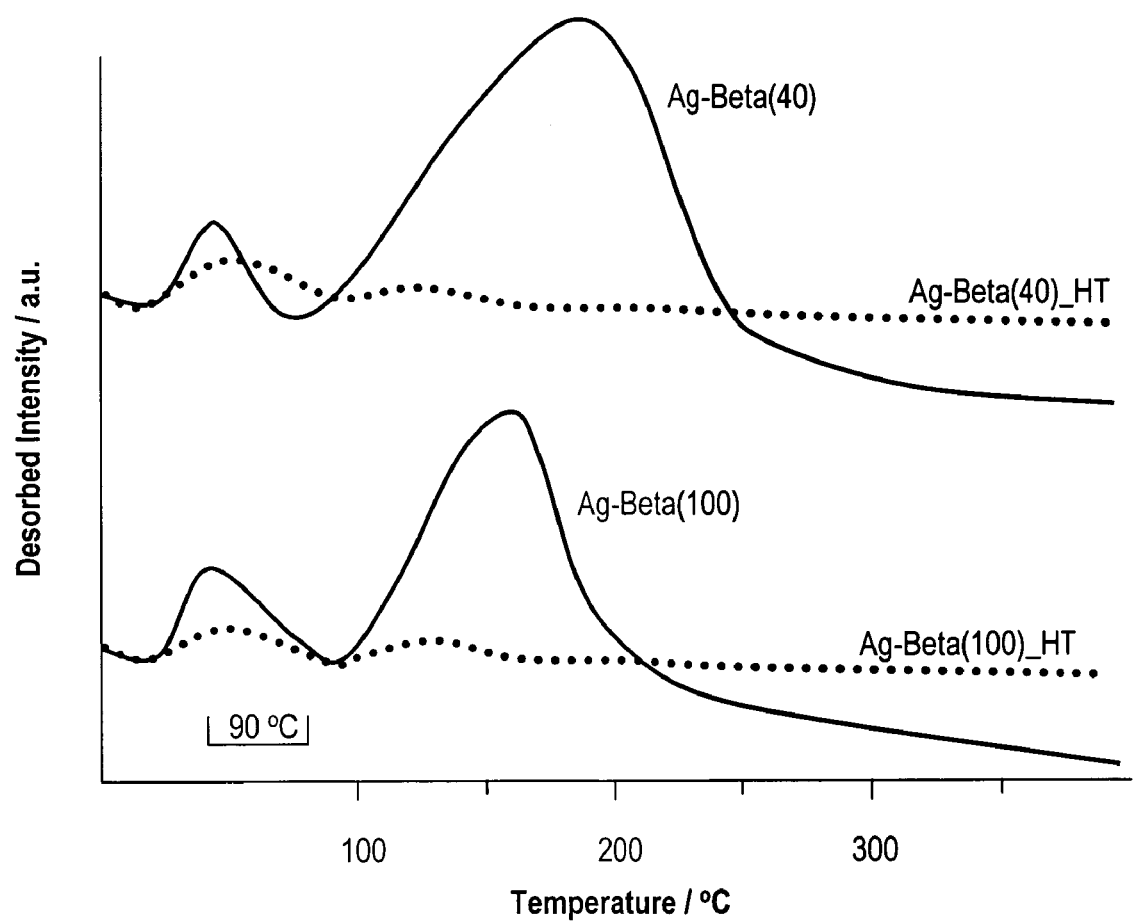
FIG. 14 shows the toluene desorption profiles for Ag-zeolite-β(100) before and after hydrothermal treatment at 800° C.
Figure 15:
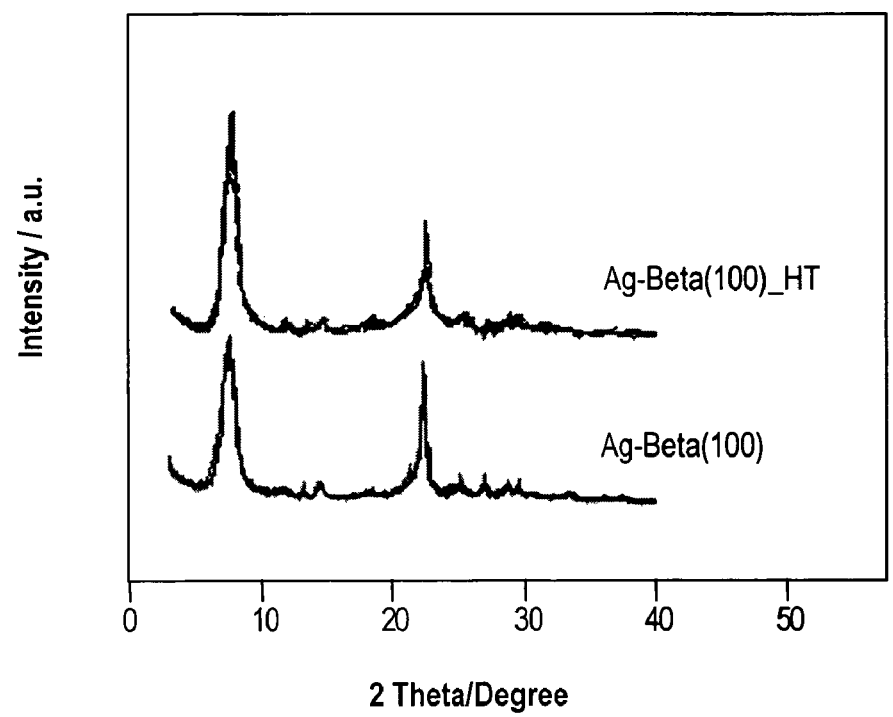
FIG. 15 shows the X-ray powder diffraction patterns for Ag-zeolite-β(100) and Ag-zeolite-β(40) before and after hydrothermal treatment.
Figure 15:
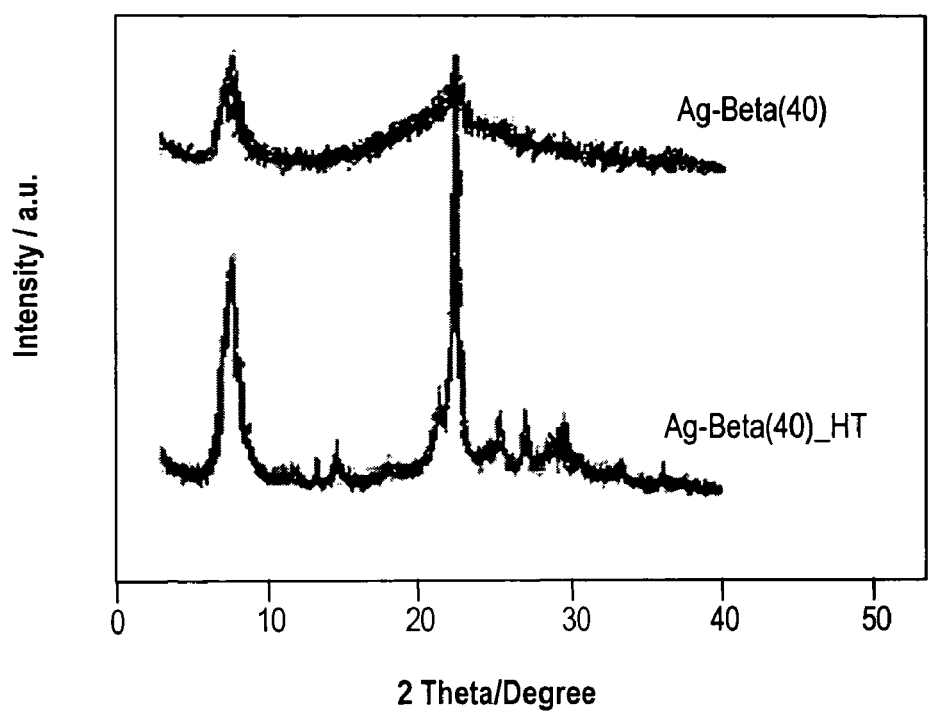

FIG. 14 shows the toluene desorption profiles for Ag-zeolite-β(100) before and after hydrothermal treatment at 800° C., in which a large decrease in the adsorption capacity was observed after hydrothermal treatment. FIG. 15 further shows the X-ray powder diffraction patterns for Ag-zeolite-β(100) Ag-zeolite-β(40) before and after hydrothermal treatment indicating that structural collapse occurred for Ag-zeolite-β(40).

Figure 16:
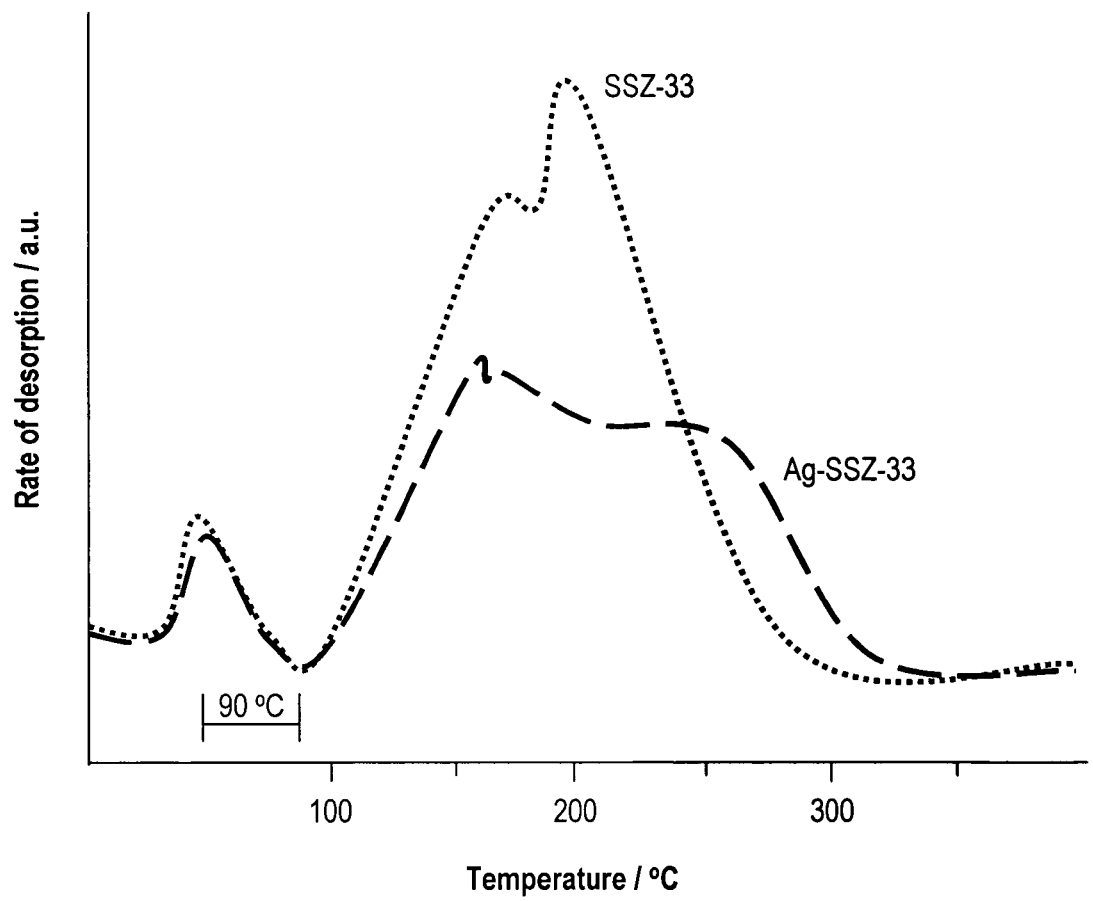
FIG. 16 shows the toluene desorption profiles for SSZ-33 and Ag-SSZ-33.

FIG. 16 presents the results obtained for the toluene desorption profiles for SSZ-33 and Ag-SSZ-33, showing that the desorption temperature is shifted to a higher temperature in spite of its lower adsorption capacity.

Figure 17:
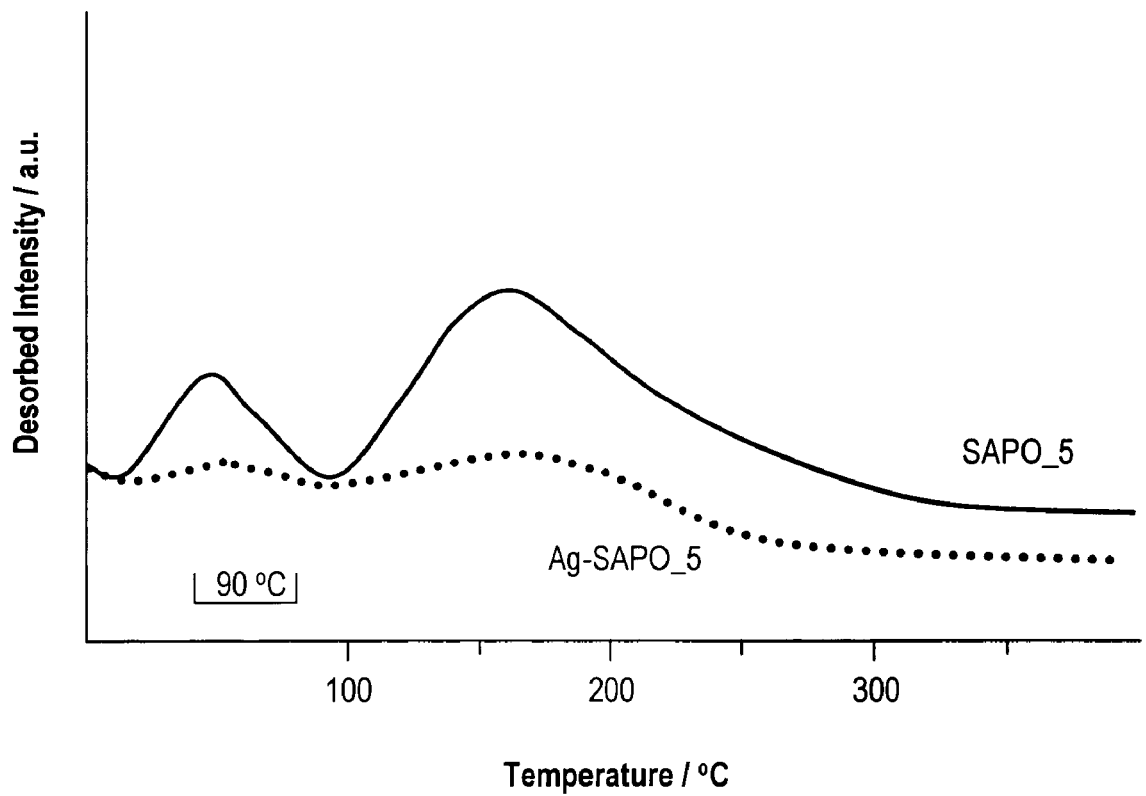
FIG. 17 shows the toluene desorption profiles for SAPO-5 and Ag-SAPO-5.

FIG. 17 presents the results obtained for the toluene desorption profiles for SAPO-5 and Ag-SAPO-5, showing that the incorporation of Ag significantly reduced the adsorption capacity and the desorption temperature.

Figure 18:
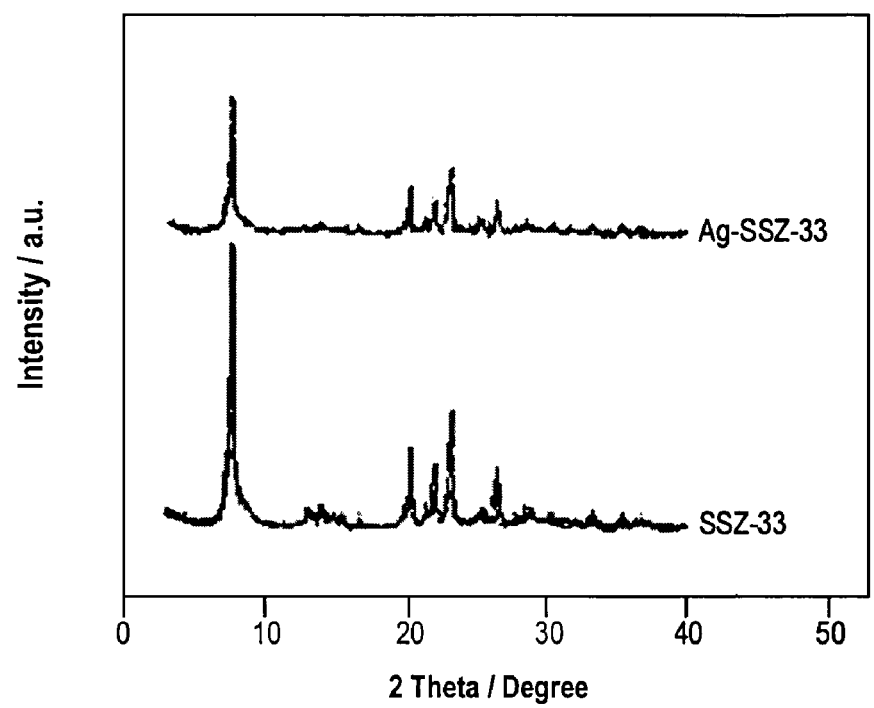
FIG. 18 depicts the X-ray powder diffraction patterns for SSZ-33, Ag-SSZ-33, SAPO-5, and Ag-SAPO-5.
Figure 18:
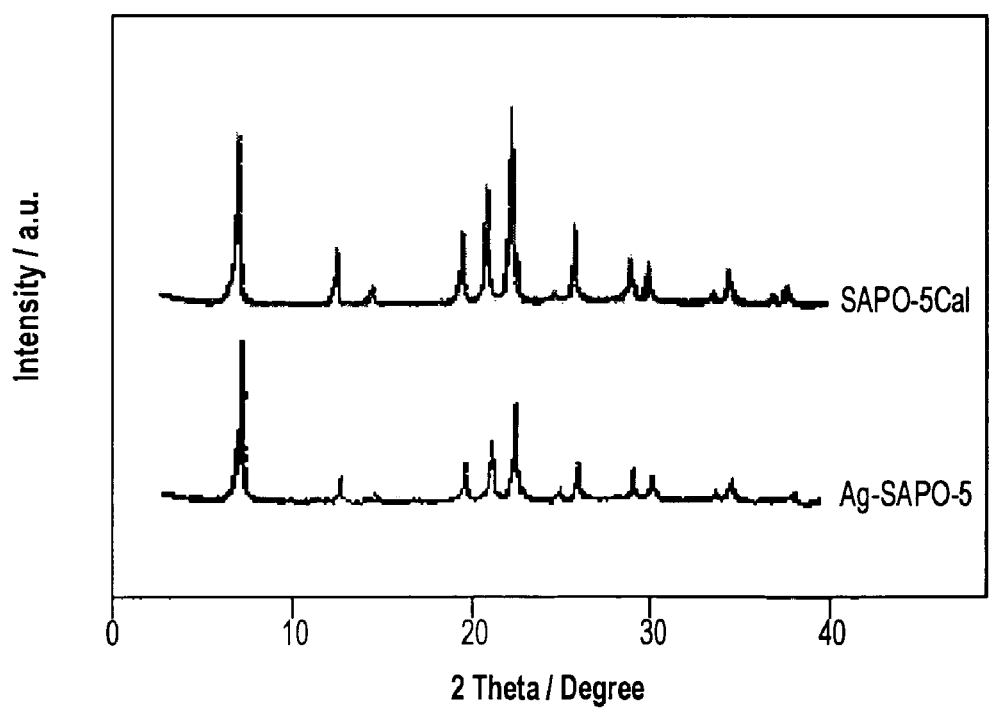

FIG. 18 presents the results obtained for the X-ray powder diffraction patterns for SSZ-33 and Ag-SSZ-33 and SAPO-5 and Ag-SAPO-5.

Figure 19:
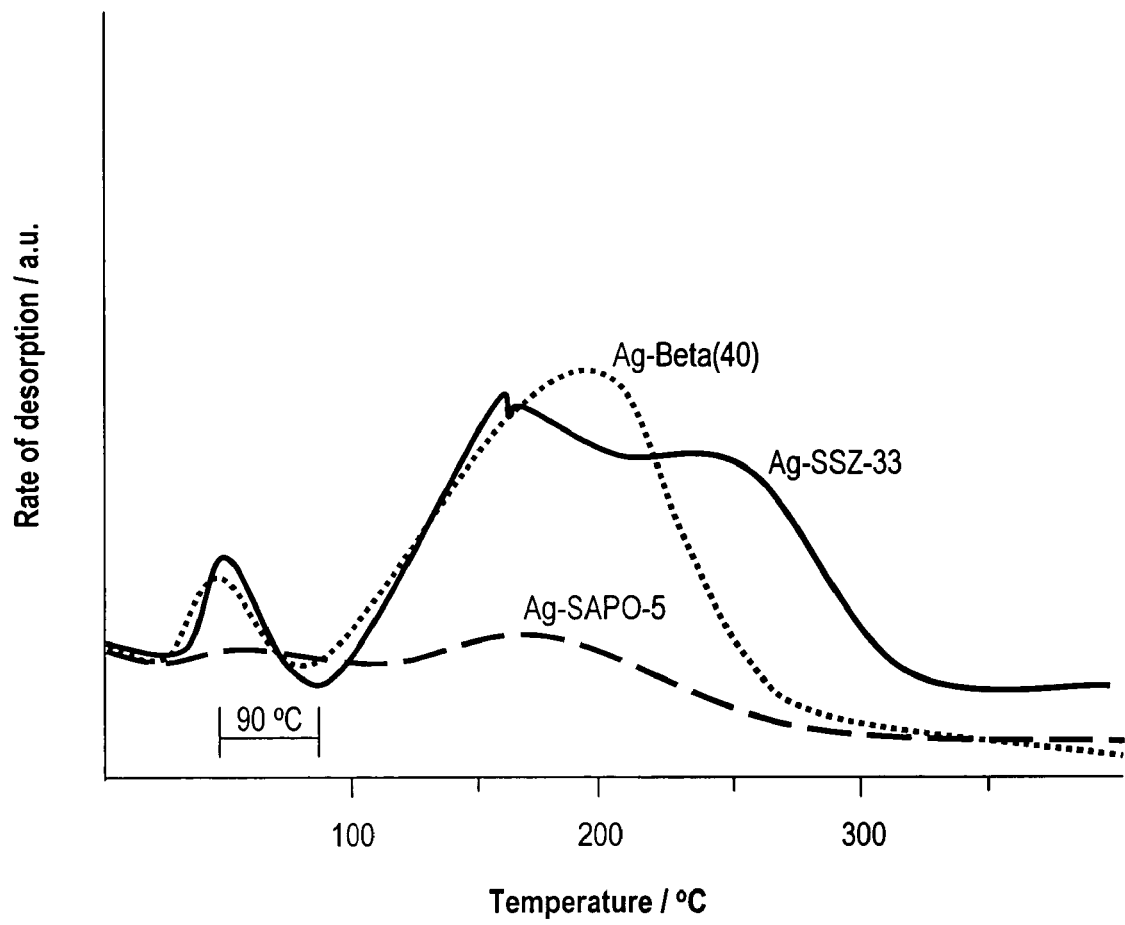
FIG. 19 shows the toluene desorption profiles for Ag exchanged SSZ-33, zeolite-β(40), and SAPO-5.

FIG. 19 presents the results obtained for the toluene desorption profiles for Ag exchanged SSZ-33, zeolite-β(40), and SAPO-5, showing that Ag-SSZ-33 exhibits better desorption activity (i.e., higher adsorption capacity, desorption amount and increased desorption temperature) compared with Ag-zeolite-β(40), and Ag-SAPO-5.

Table 2 further quantitatively summarizes the desorption temperatures observed for SSZ-33, zeolite-β, and SAPO zeolites, hydrothermally treated zeolites and Ag exchanged zeolites. Of particular note, the end and $T_{max}$ desorption temperatures ($D_{end}$ and $D_{Tmax}$) for SSZ-33 are superior to zeolite-β(100).

TABLE 2

Desorption Temperatures for zeolites, hydrothermally treated zeolites and Ag exchanged zeolites

| sample | Amount desorbed (mg) | $D_{start}$ (° C.) | $D_{end}$ (° C.) | $D_{Tmax}$ (° C.) |
|---|---|---|---|---|
| zeolite-β(1590) | 19.4 | 100 | 214 | 152 |
| zeolite-β(40) | 30 | 106 | 280 | 170, 212, 234 |
| zeolite-β(100) | 51 | 94 | 300 | 163 |
| Ag-zeolite-β(40) | 49.9 | 97 | 297 | 192 |
| Ag-zeolite-β(100) | 52.3 | 94 | 268 | 157 |
| β(100) HT 600° C. | 50.2 | 94 | 264 | 166 |
| β(100) HT 700° C. | 51.6 | 92 | 262 | 177 |
| β(100) HT 800° C. | 48.7 | 93 | 214 | 152 |
| SAPO-5 | 48.7 | 101 | 300 | 160 |
| SAPO-11 | 50.6 | 104 | 242 | 142 |
| SAPO-41 | 31.3 | 106 | 258 | 163 |
| SAPO-5 HT 800° C. | 51.6 | | | |
| SAPO-5 HT 700° C. | 51.3 | 90 | 266 | 128 |
| SAPO-5 HT 600° C. | 50.2 | 90 | 266 | 133 |
| SSZ-33 | 50.7 | 96 | 285 | 169, 188 |
| SSZ-33 HT | 50.5 | 92 | 230 | 163 |
| SSZ-33 10K/min | 50.0 | 51 | 240 | 135, 168 |
| SSZ-33 20K/min | 50.5 | 54 | 291 | 157, 160, 188 |
| SSZ-33 30K/min | 50.4 | 53 | 280 | 169, 193 |
| Ag-SSZ-33 | 50.5 | 92 | 230 | 163 |

Example 8

SEM Results for Hydrothermally Treated Zeolites

Figure 20:
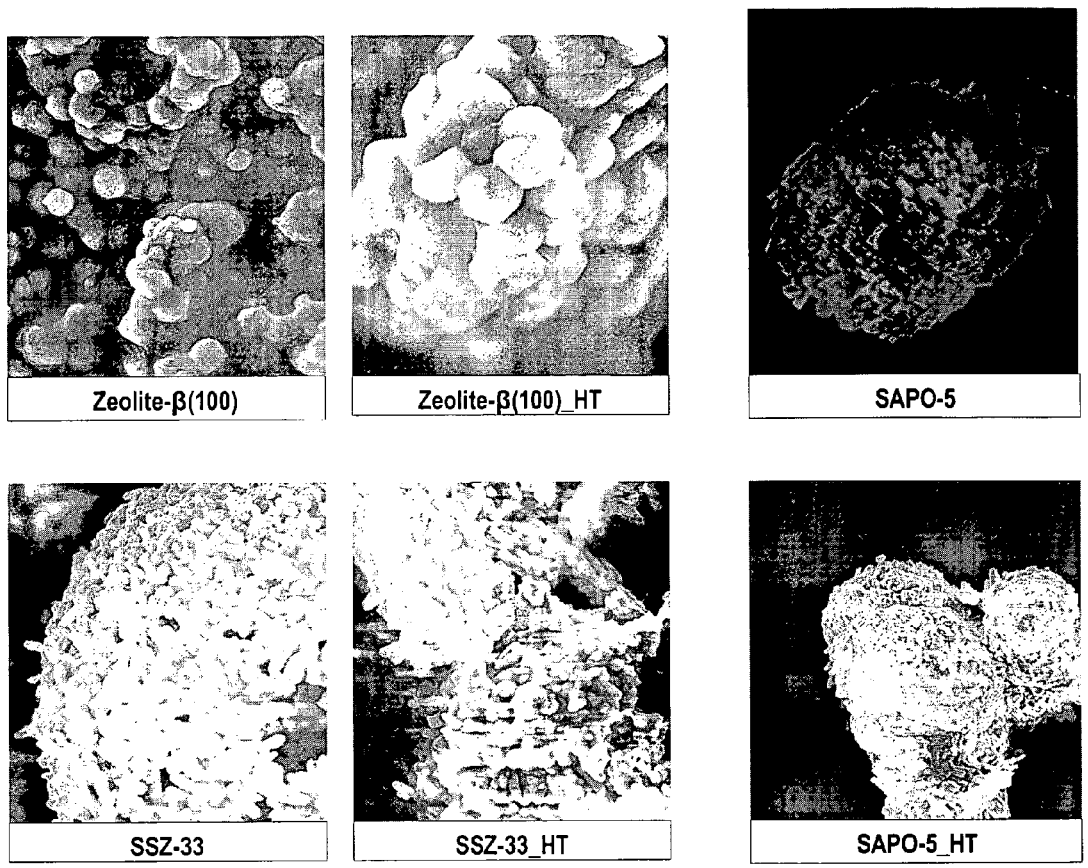
FIG. 20 show SEM photomicrographs of certain zeolites hydrothermally treated at 800° C. in which particle agglomeration is evident.

FIG. 20 presents SEM photomicrographs obtained of certain zeolites hydrothermally treated at 800° C. in which particle agglomeration is evident.

We claim:

1. A method of treating exhaust gas that comprises a hydrocarbon combustion product, the method comprising:
    a) contacting the exhaust gas: (1) with a CON topology molecular sieve for a time period effective to facilitate adsorption of the hydrocarbon combustion product by the molecular sieve; and (2) with a hydrocarbon conversion catalyst in a catalytic converter downstream of the molecular sieve;
    b) passing the exhaust gas through the molecular sieve to remove adsorbed hydrocarbon combustion product therefrom; and
    c) contacting the exhaust gas containing the removed hydrocarbon combustion product with the hydrocarbon conversion catalyst.

2. The method of claim 1, wherein a), b), and c) are carried out sequentially and continuously with a flowing exhaust gas.

3. The method of claim 1, wherein the CON topology molecular sieve is contained within an adsorbent material comprised of the CON topology molecular sieve.

4. The method of claim 1, wherein the exhaust gas comprises a plurality of hydrocarbon combustion products.

5. The method of claim 1, wherein the CON topology molecular sieve is selected to provide improved adsorption of the adsorbed hydrocarbon combustion product compared to a non-CON topology molecular sieve.

6. The method of claim 5, wherein the non-CON topology molecular sieve is a non-CON topology zeolite selected from zeolite-β, zeolite-Y, mordenite, or ZSM-5.

7. The method of claim 1, wherein the CON topology molecular sieve is selected to provide improved adsorption of the hydrocarbon combustion product compared to a non-CON topology molecular sieve before or after the same hydrothermal treatment of the CON topology molecular sieve and the non-CON topology molecular sieve.

8. The method of claim 7, wherein the hydrothermal treatment of the CON topology molecular sieve and the non-CON topology molecular sieve is carried out in the presence of 10 wt. % water vapor at 800° C. for about 5 hours in a stream of air at 25 mL/min.

9. The method of claim 7, wherein the CON topology molecular sieve provides improved adsorption of the hydrocarbon combustion product compared to a non-CON topology molecular sieve after the same hydrothermal treatment of the CON topology molecular sieve and the non-CON topology molecular sieve.

10. The method of claim 8, wherein the CON topology molecular sieve provides improved adsorption of the hydrocarbon combustion product compared to a non-CON topology molecular sieve after the same hydrothermal treatment of the CON topology molecular sieve material and the non-CON topology molecular sieve.

11. The method of claim 9, wherein the CON topology molecular sieve provides improved adsorption of the hydrocarbon combustion product compared to a non-CON topology molecular sieve both before and after the same hydrothermal treatment of the CON topology molecular sieve material and the non-CON topology molecular sieve.

12. The method of claim 10, wherein the CON topology molecular sieve provides improved adsorption of the hydrocarbon combustion product compared to a non-CON topology molecular sieve both before and after the same hydrothermal treatment of the CON topology molecular sieve material and the non-CON topology molecular sieve.

13. The method of claim 5, wherein the improved adsorption of the hydrocarbon combustion product by the CON topology molecular sieve is characterized by an increased adsorption capacity or an increased desorption temperature compared to the non-CON topology molecular sieve.

14. The method of claim 13, wherein the improved adsorption of the hydrocarbon combustion product by the CON topology molecular sieve is characterized by an increased adsorption capacity compared to the non-CON topology molecular sieve.

15. The method of claim 14, wherein the increased adsorption capacity of the CON topology molecular sieve is at least 1.1 times the adsorption capacity of the non-CON topology molecular sieve.

16. The method of claim 15, wherein the increased adsorption capacity of the CON topology molecular sieve is at least 1.2 times the adsorption capacity of the non-CON topology molecular sieve.

17. The method of claim 16, wherein the increased adsorption capacity of the CON topology molecular sieve is at least 1.25 times the adsorption capacity of the non-CON topology molecular sieve.

18. The method of claim 13, wherein the improved adsorption of the hydrocarbon combustion product by the CON topology molecular sieve is characterized by an increased desorption temperature compared to the non-CON topology molecular sieve.

19. The method of claim 13, wherein the improved adsorption of the hydrocarbon combustion product by the CON topology molecular sieve is characterized by both an increased adsorption capacity and an increased desorption temperature compared to the non-CON topology molecular sieve.

20. The method of claim 1, wherein the CON topology molecular sieve is a CON topology silicate molecular sieve.

21. The method of claim 20, wherein the CON topology silicate molecular sieve comprises a framework heteroatom selected from Al, B, Ga, Fe, Zn, Mg, Co, Ge and mixtures thereof.

22. The method of claim 1, wherein the CON topology zeolite comprises a CON topology molecular sieve selected from SSZ-33, SSZ-26, CIT-1, ITQ-24, and mixtures thereof.

23. The method of claim 1, wherein the CON topology molecular sieve comprises SSZ-33.

24. The method of claim 1, wherein the CON topology molecular sieve comprises a CON topology molecular sieve that contains a metal cation selected from rare earth, Group 2 metals, Groups 8-10 metals, and mixtures thereof.

25. The method of claim 24, wherein the metal cation is selected from Mn, Ca, Mg, Zn, Cd, Pt, Pd, Ni, Co, Ti, Al, Sn, Fe, Co, and mixtures thereof.

26. The method of claim 1, wherein the CON topology molecular sieve comprises a CON topology molecular sieve that contains a metal selected from Cu, Ag, Au and mixtures thereof.

27. The method of claim 26, wherein the metal comprises Ag.

28. The method of claim 23, wherein the CON topology molecular sieve comprises SSZ-33 or Ag-SSZ-33.

29. The method of claim 1, wherein the hydrocarbon combustion product is derived from the combustion of a hydrocarbon fuel in an engine.

30. The method of claim 29, wherein the hydrocarbon combustion product is derived from the combustion of a hydrocarbon fuel in an internal combustion engine.

31. The method of claim 30, wherein the internal combustion engine includes an exhaust system and the method is utilized to reduce the cold start emission of hydrocarbons from the exhaust system.

32. The method of claim 1, wherein the hydrocarbon combustion product comprises a linear or branched chain non-aromatic hydrocarbon, an aromatic hydrocarbon, a polycyclic hydrocarbon, or mixtures thereof.

33. The method of claim 32, wherein the aromatic hydrocarbon includes toluene, xylene, benzene, or mixtures thereof.

34. The method of claim 1, wherein the hydrocarbon conversion catalyst is contacted by the exhaust gas for a time period effective to raise the temperature of the hydrocarbon conversion catalyst to the catalyst light-off temperature.

* * * * *